US012066770B2

(12) United States Patent
Sudo

(10) Patent No.: US 12,066,770 B2
(45) Date of Patent: Aug. 20, 2024

(54) DEVELOPER CONTAINER, IMAGE FORMING UNIT, AND IMAGE FORMING APPARATUS

(71) Applicant: Oki Electric Industry Co., Ltd., Tokyo (JP)

(72) Inventor: Kaori Sudo, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 18/151,124

(22) Filed: Jan. 6, 2023

(65) Prior Publication Data

US 2023/0305436 A1 Sep. 28, 2023

(30) Foreign Application Priority Data

Mar. 23, 2022 (JP) ................................ 2022-046932

(51) Int. Cl.
*G03G 15/08* (2006.01)

(52) U.S. Cl.
CPC ....... *G03G 15/087* (2013.01); *G03G 15/0886* (2013.01); *G03G 15/0889* (2013.01); *G03G 2215/0816* (2013.01)

(58) Field of Classification Search
CPC ............ G03G 15/087; G03G 15/0886; G03G 15/0889; G03G 2215/0816; G03G 2215/0802
See application file for complete search history.

(56) References Cited

U.S. PATENT DOCUMENTS

2010/0143011 A1* 6/2010 Tawada ............... G03G 21/007 399/358
2014/0003844 A1* 1/2014 Oda .................. G03G 15/0865 399/263

FOREIGN PATENT DOCUMENTS

JP 2009-265375 * 11/2009
JP 2009265375 A 11/2009
JP 2014-010225 A 1/2014
JP 2014149437 A 8/2014

* cited by examiner

*Primary Examiner* — Sandra Brase
(74) *Attorney, Agent, or Firm* — Rabin & Berdo, P.C.

(57) ABSTRACT

A developer container includes: a container body that stores developer; an agitating member that is rotatably disposed in the container body and rotates to agitate the developer; a first swing member that includes a first fixed end, a first free end, a first surface, and a second surface opposite the first surface, and that is swung by the agitating member coming into contact with the first surface when the agitating member rotates; and a projecting support that is disposed to face the second surface and project from a wall surface formed in the container body, and that abuts the second surface.

10 Claims, 21 Drawing Sheets

DEVELOPER CONTAINER, IMAGE FORMING UNIT, AND IMAGE FORMING APPARATUS

BACKGROUND OF THE INVENTION

1. Field of the Invention

The present disclosure relates to a developer container, an image forming unit, and an image forming apparatus.

2. Description of the Related Art

Conventionally, an image forming apparatus such as a printer, a copier, a facsimile machine, or a multi-function peripheral includes image forming units that form toner images of respective colors. In each image forming unit, the toner image is formed by uniformly charging a surface of a photosensitive drum with a charging roller, exposing the charged surface with an exposure device (e.g., an LED head) to form an electrostatic latent image, and developing the electrostatic latent image with toner as developer supplied from a toner cartridge as a developer container. The toner images are transferred onto a paper sheet with transfer rollers and then fixed to the paper sheet in a fixing unit, so that an image is printed.

Each toner cartridge includes a toner storage chamber that stores toner, an opening for discharging the stored toner formed in a lower portion of the toner cartridge, an agitating member rotatably disposed in the toner storage chamber, and a swing member swingably disposed in the toner storage chamber. In the toner storage chamber, the agitating member is rotated to agitate the toner, and the swing member is swung to move the toner toward the opening (see, e.g., Japanese Patent Application Publication No. 2014-10225).

However, in the conventional toner cartridge, toner may adhere to a wall surface with which the swing member does not come into contact when the swing member is swung in the toner storage chamber. In this case, toner remaining in the toner storage chamber cannot be sufficiently discharged.

SUMMARY OF THE INVENTION

An object of the present disclosure is to provide a developer container, an image forming unit, and an image forming apparatus capable of sufficiently discharging developer.

According to an aspect of the present disclosure, there is provided a developer container including: a container body that stores developer; an agitating member that is rotatably disposed in the container body and rotates to agitate the developer; a first swing member that includes a first fixed end, a first free end, a first surface, and a second surface opposite the first surface, and that is swung by the agitating member coming into contact with the first surface when the agitating member rotates; and a projecting support that is disposed to face the second surface and project from a wall surface formed in the container body, and that abuts the second surface.

DETAILED DESCRIPTION OF THE INVENTION

Embodiments of the present disclosure will be described below in detail with reference to the drawings. Toner cartridges serving as developer containers and a printer serving as an image forming apparatus will be described.

Figure 2:
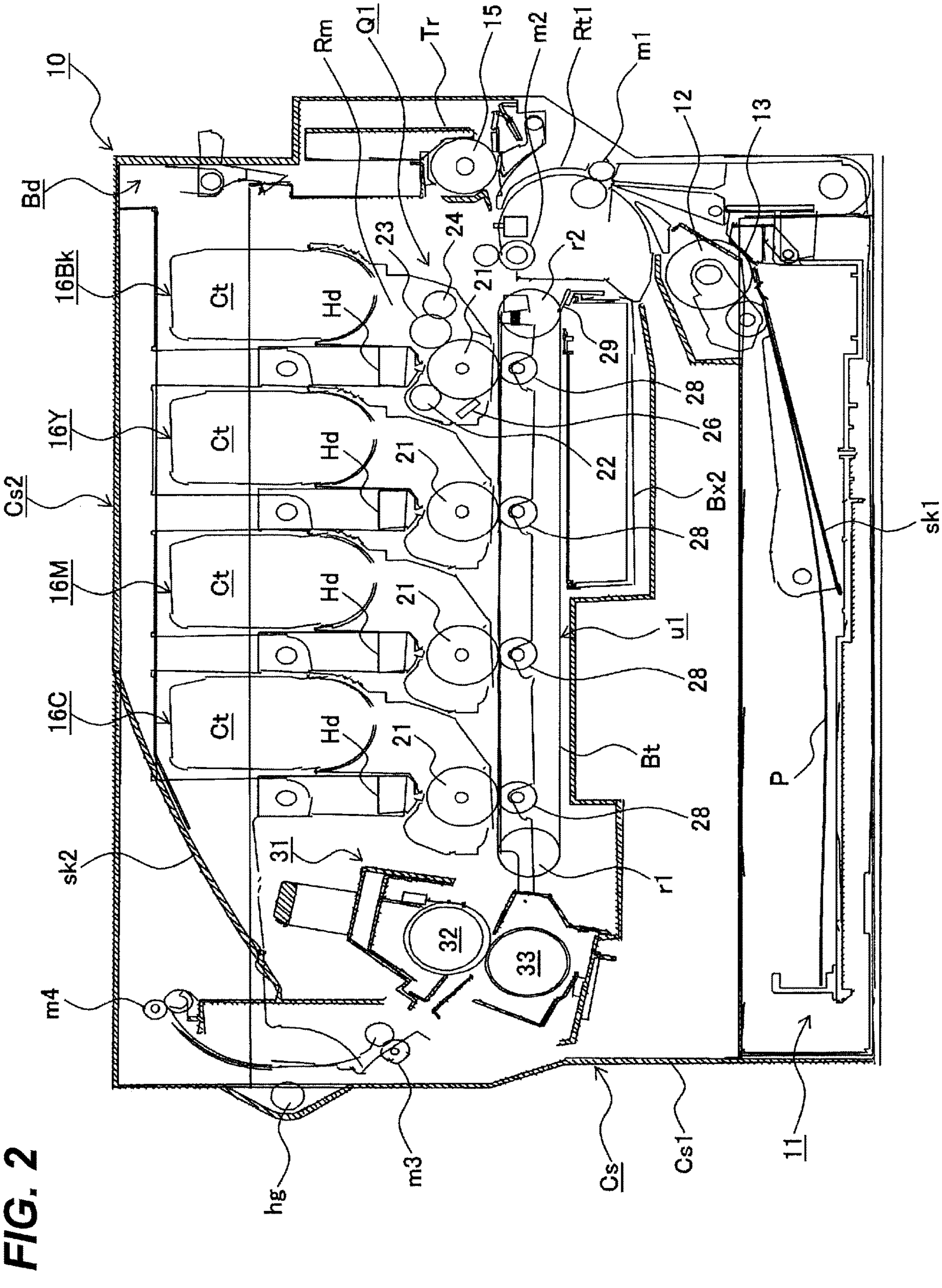
FIG. 2 is a schematic view of a printer of the first embodiment of the present disclosure.
Figure 3:
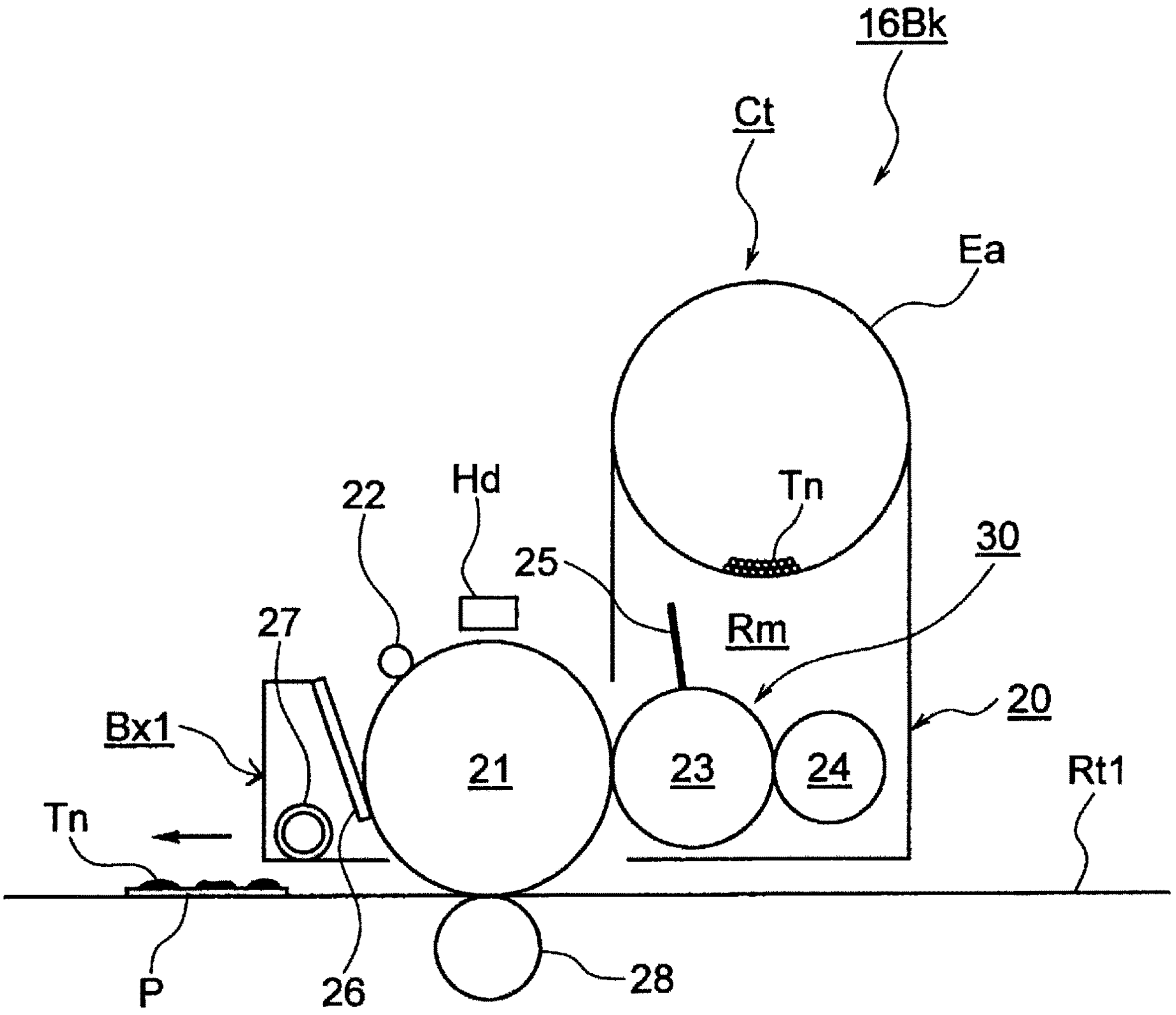
FIG. 3 is a view for explaining a relationship between an image forming unit and a transfer roller in the first embodiment of the present disclosure.
Figure 4:
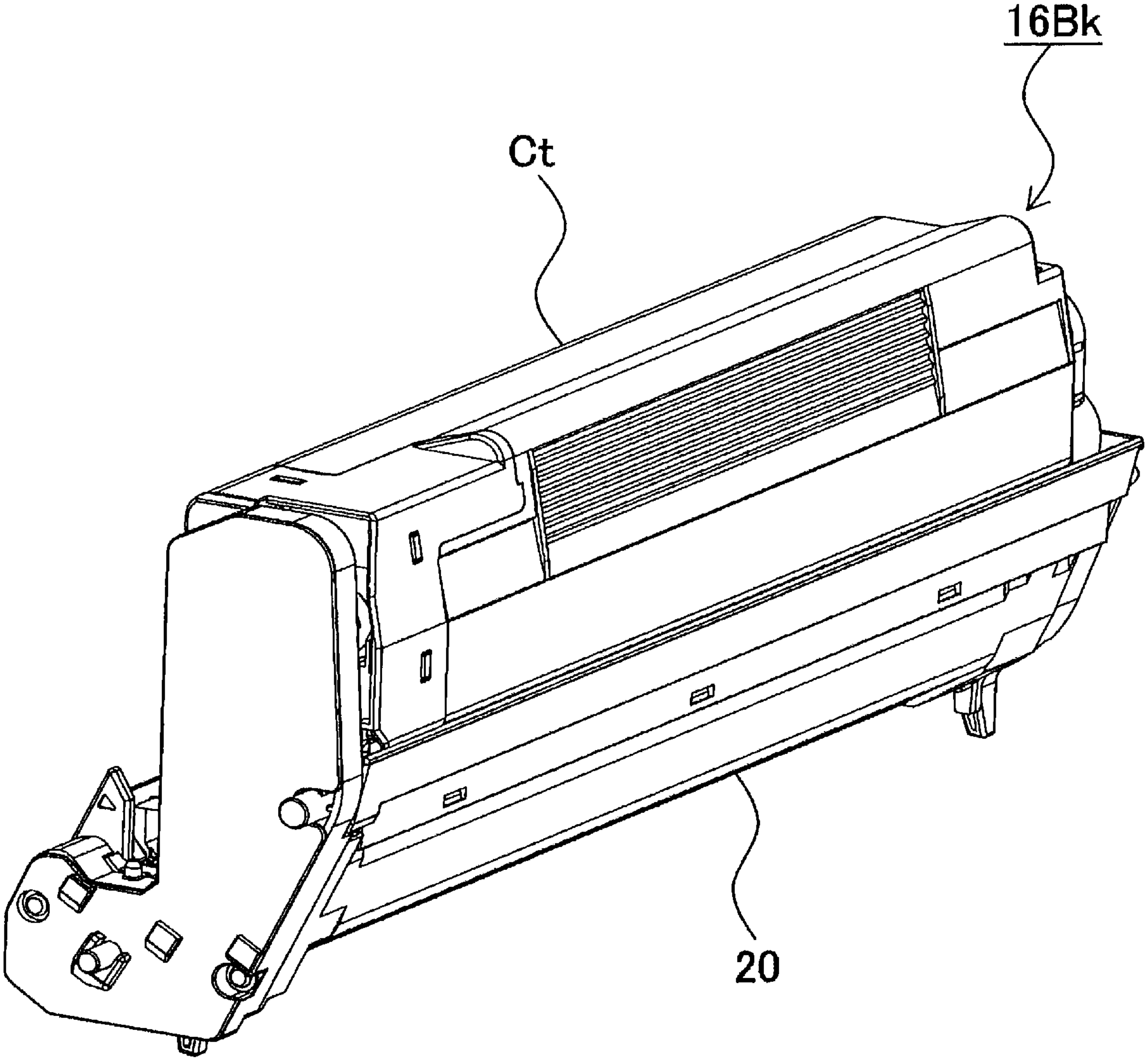
FIG. 4 is a perspective view of the image forming unit of the first embodiment of the present disclosure.
Figure 5:
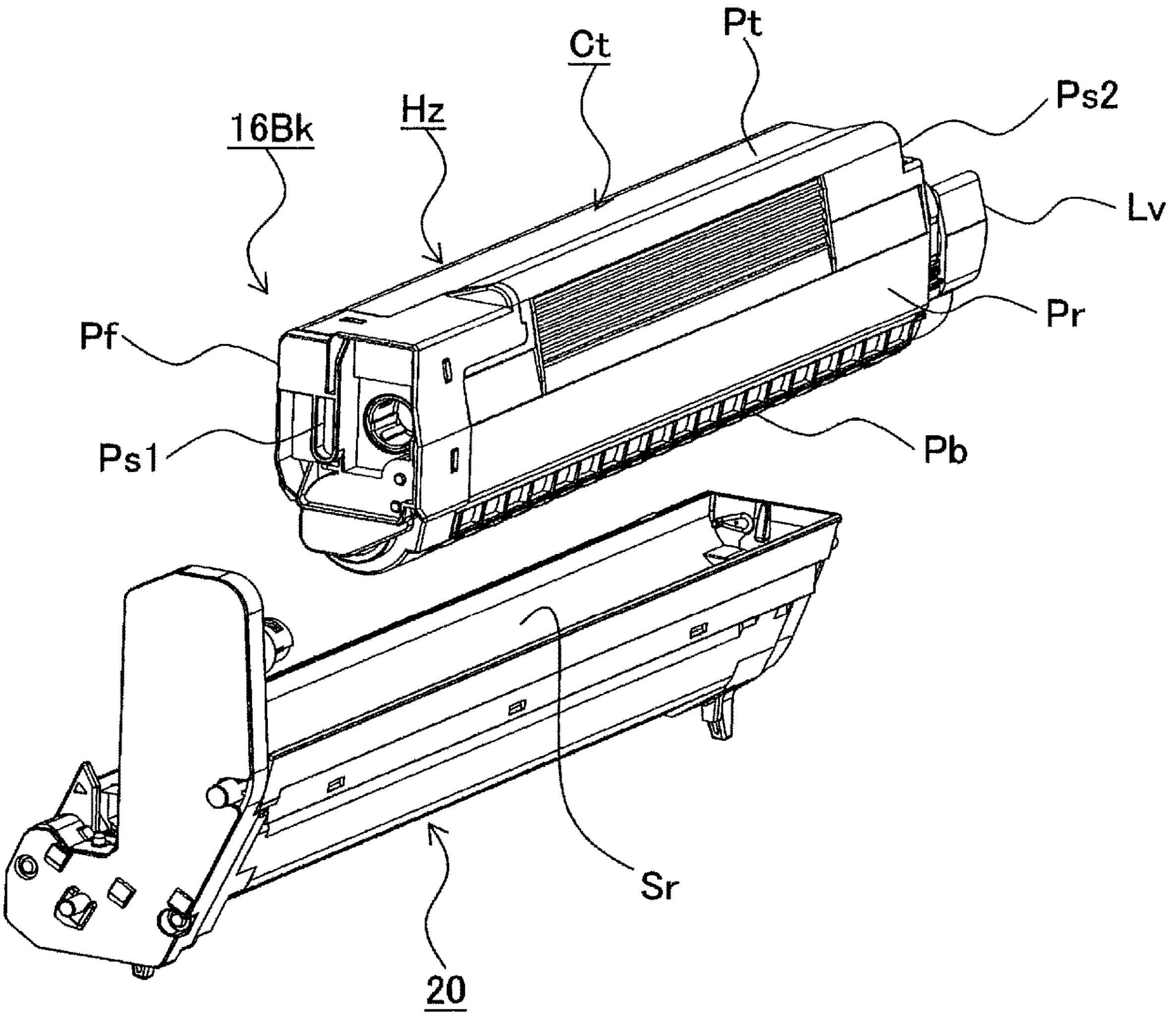
FIG. 5 is an exploded view of the image forming unit of the first embodiment of the present disclosure.

FIG. 2 is a schematic view of a printer of a first embodiment of the present disclosure. FIG. 3 is a view for explaining a relationship between an image forming unit and a transfer roller in the first embodiment of the present disclosure. FIG. 4 is a perspective view of the image forming unit of the first embodiment of the present disclosure. FIG. 5 is an exploded view of the image forming unit of the first embodiment of the present disclosure. In this embodiment, image forming units (or image drum units) 16Bk, 16Y, 16M, and 16C of four colors of black, yellow, magenta, and cyan are disposed in a printer 10. Since the image forming units 16Bk, 16Y, 16M, and 16C have the same configuration, FIGS. 3 to 5 illustrate only the image forming unit 16Bk.

In FIG. 2, the printer 10 includes a main body (or apparatus main body) Bd including a housing Cs that is an exterior of the printer 10. The housing Cs includes a main body (or housing main body) Cs1 and a cover Cs2 that is supported pivotably relative to the housing main body Cs1 by means of a hinge hg. The housing main body Cs1 is a lower frame and the cover Cs2 is an upper frame.

A sheet cassette 11, which serves as a first sheet feed portion and a medium container, is disposed in a lower portion of the apparatus main body Bd, and sheets (e.g., paper sheets) P as media are stored in the sheet cassette 11 in such a manner as to be stacked on a stacker sk1 as a first stacker of the sheet cassette 11. Also, a hopping roller 12 as a first feeder is disposed adjacent to a front end of the sheet cassette 11, and a separator 13 is disposed to face the hopping roller 12. The sheets P are separated and fed one by one to a sheet conveying path Rt1 as a medium conveying path by the hopping roller 12 and separator 13. The fed sheet P is conveyed on the sheet conveying path Rt1 by a pair of sheet feed rollers m1 as a first conveyor, is subjected to skew correction by a pair of registration rollers m2 as a second conveyor disposed downstream of the pair of sheet feed rollers m1, and is then fed to an image forming portion Q1.

Near the pair of registration rollers m2, a manual feed tray Tr as a second sheet feed portion is disposed pivotably relative to the housing main body Cs1. A sheet P placed on the manual feed tray Tr is fed to the sheet conveying path Rt1 by a hopping roller 15 as a second feeder, is subjected to skew correction by the pair of registration rollers m2, and is then fed to the image forming portion Q1.

The image forming portion Q1 is constituted by the image forming units 16Bk, 16Y, 16M, and 16C, which are arranged from the upstream side to the downstream side of the sheet conveying path Rt1, light emitting diode (LED) heads Hd as exposure devices, a transfer unit u1, and the like.

Each of the image forming units 16Bk, 16Y, 16M, and 16C is constituted by an image former 20 that is a main body of the image forming unit, and a toner cartridge Ct as a developer container that is detachably mounted to the image former 20. Toner Tn as developer is stored in a toner storage chamber Ea as a developer storage chamber of the toner cartridge Ct.

The toner cartridge Ct includes a housing Hz constituted by a front wall Pf formed on a downstream side in a conveying direction of the sheet P, a rear wall Pr formed on an upstream side in the conveying direction of the sheet P, a left wall Ps1 as a first side wall formed on the left side as viewed from the upstream side in the conveying direction of the sheet P, a right wall Ps2 as a second side wall formed on the right side as viewed from the upstream side in the conveying direction of the sheet P, a top wall Pt, and a bottom wall Pb. In FIG. 5, the toner cartridge Ct includes an operating lever Lv as an operating portion for rotating a shutter Sh (to be described later) as an opening and closing member. The operating lever Lv projects from the right wall Ps2.

The image former 20 includes a mounting surface Sr forming a recess having a shape corresponding to the bottom wall Pb, and the toner cartridge Ct is held by the mounting surface Sr.

The image former 20 also includes a photosensitive drum 21 as an image carrier that is rotatably disposed, a charging roller 22 as a charging member that is rotatably disposed in contact with the photosensitive drum 21 at a predetermined pressure, a developing roller 23 as a developer carrier that is rotatably disposed in contact with the photosensitive drum 21 at a predetermined pressure, a supply roller (which is a sponge roller) 24 as a supply member that is rotatably disposed in contact with the developing roller 23 at a predetermined pressure, a developing blade 25 as a regulating member that is disposed such that a predetermined portion of the developing blade 25 is in contact with the developing roller 23 at a predetermined pressure, a cleaning device Bx1 that is disposed to face the photosensitive drum 21, and the like. The cleaning device Bx1 includes a cleaning blade 26 as a first cleaning member that is disposed such that a tip of the cleaning blade 26 is in contact with the photosensitive drum 21 at a predetermined pressure, a spiral 27 as a waste developer conveying member that is rotatably disposed, and the like.

The developing roller 23, supply roller 24, and developing blade 25 constitutes a developing unit 30. In each of the image forming units 16Bk, 16Y, 16M, and 16C, a toner storage portion Rm as a developer storage portion that receives toner Tn discharged from the toner cartridge Ct is formed above the developing unit 30 in the image former 20.

In each of the image forming units 16Bk, 16Y, 16M, and 16C, toner Tn supplied to the toner storage portion Rm is supplied to the developing roller 23 by the supply roller 24 while being charged by the supply roller 24, and after the layer thickness is regulated by the developing blade 25, applied to the photosensitive drum 21 to form a toner image. Toner Tn remaining on the developing roller 23 is conveyed to the toner storage portion Rm with rotation of the developing roller 23, scraped off by the supply roller 24, and mixed with fresh toner Tn discharged from the toner cartridge Ct.

In the cleaning device Bx1, the cleaning blade 26 abuts the photosensitive drum 21 with its tip counter to the rotation direction of the photosensitive drum 21, and scrapes off toner Tn remaining on the photosensitive drum 21 after a toner image is transferred to a sheet P, thereby removing the toner Tn as waste toner as waste developer. The waste toner is conveyed by the spiral 27 and collected into a waste toner collecting chamber Eb (see FIG. 1) (to be described later) as a waste developer collecting portion formed adjacent to the toner storage chamber Ea of the toner cartridge Ct.

The LED heads Hd are each constituted by an LED array constituted by multiple LEDs as light emitting elements, driving elements that cause the respective LEDs to emit light, and a lens array, and expose surfaces of the photosensitive drums 21 charged by the charging rollers 22 to form electrostatic latent images as latent images.

The transfer unit u1 includes a drive roller r1 as a first roller, a driven roller r2 as a second roller, a transfer belt Bt as a belt movably supported and stretched by the drive roller r1 and driven roller r2, transfer rollers 28 as transfer members rotatably disposed to face the respective photosensitive drums 21 with the transfer belt Bt therebetween, a toner collecting portion Bx2 as a developer collecting device disposed to face a lower portion of the transfer belt Bt, a cleaning blade 29 as a second cleaning member disposed in the toner collecting portion Bx2 with its tip in contact with the transfer belt Bt, and the like.

A fixing unit 31 as a fixing device is disposed downstream of the image forming portion Q1 in the sheet conveying path Rt1. The fixing unit 31 includes a heat roller 32 serving as a first fixing member, and a backup roller 33 serving as a second fixing member and an opposing member disposed opposite the heat roller 32.

A pair of conveying rollers m3 as a third conveyor is disposed downstream of the fixing unit 31 in the sheet conveying path Rt1, and a pair of discharging rollers m4 as a fourth conveyor is disposed downstream of the pair of conveying rollers m3 to face a stacker sk2 as a second stacker formed in the cover Cs2.

Next, an operation of the printer 10 will be described.

In each of the image forming units 16Bk, 16Y, 16M, and 16C, the photosensitive drum 21 is rotated by an ID motor (not illustrated) as a driver for image formation, and the surface of the photosensitive drum 21 is uniformly charged by the charging roller 22 and exposed by the corresponding LED head Hd, so that an electrostatic latent image is formed. In the developing unit 30, the supply roller 24 is rotated, and toner Tn discharged from the toner cartridge Ct and supplied to the toner storage portion Rm is charged by friction and supplied to the developing roller 23. The toner Tn supplied to the developing roller 23 has its layer thickness regulated by the developing blade 25 and further charged at this time. The developing roller 23 applies toner Tn to the electrostatic latent image on the photosensitive drum 21 due to electrostatic force, thereby developing the electrostatic latent image to form a toner image.

A sheet P is fed from the sheet cassette 11 or manual feed tray Tr to the image forming portion Q1, caused to electrostatically adhere to the transfer belt Bt, and conveyed between the photosensitive drums 21 of the image forming units 16Bk, 16Y, 16M, and 16C and the transfer rollers 28 of the transfer unit u1. At this time, the toner images on the respective photosensitive drums 21 are transferred onto the sheet P in a superimposed manner by electric fields formed by voltages applied to the transfer rollers 28, so that a color toner image is formed on the sheet P.

Then, the sheet P is conveyed to the fixing unit 31, and the color toner image on the sheet P is fixed to the sheet P by being heated by the heat roller 32 and pressed by the backup roller 33, so that a color image is formed on the sheet P.

The sheet P with the color image formed thereon is conveyed by the pair of conveying rollers m3, discharged outside the apparatus main body Bd by the pair of discharging rollers m4, and placed on the stacker sk2.

In this embodiment, in each of the image forming units 16Bk, 16Y, 16M, and 16C, the toner Tn stored in the toner storage chamber Ea of the toner cartridge Ct is agitated and moved toward an outlet h2 (to be described later).

Next, a reference example of the toner cartridge Ct will be described.

Figure 6:
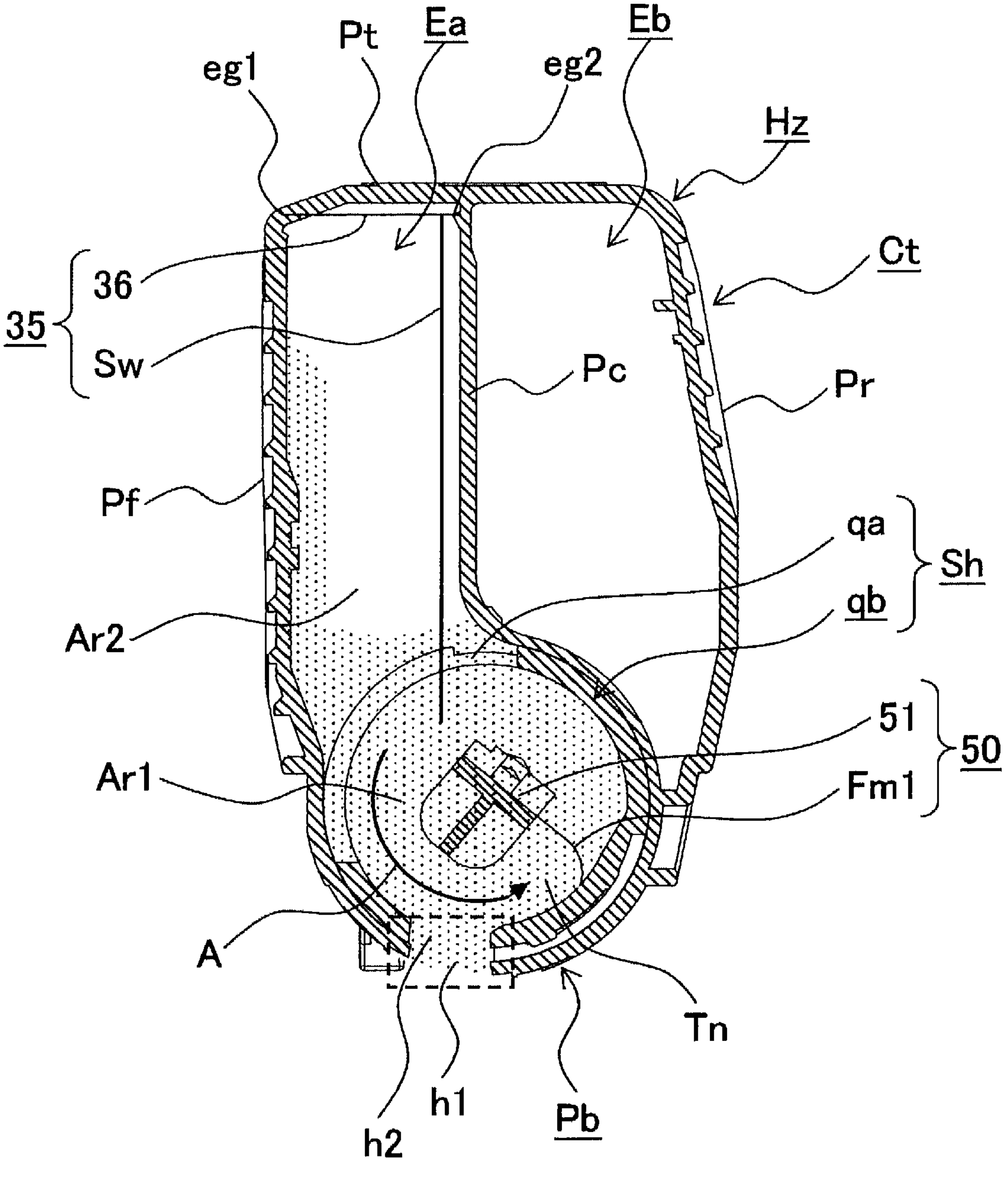
FIG. 6 is a first view for explaining an operation of a toner cartridge of a reference example.
Figure 7:
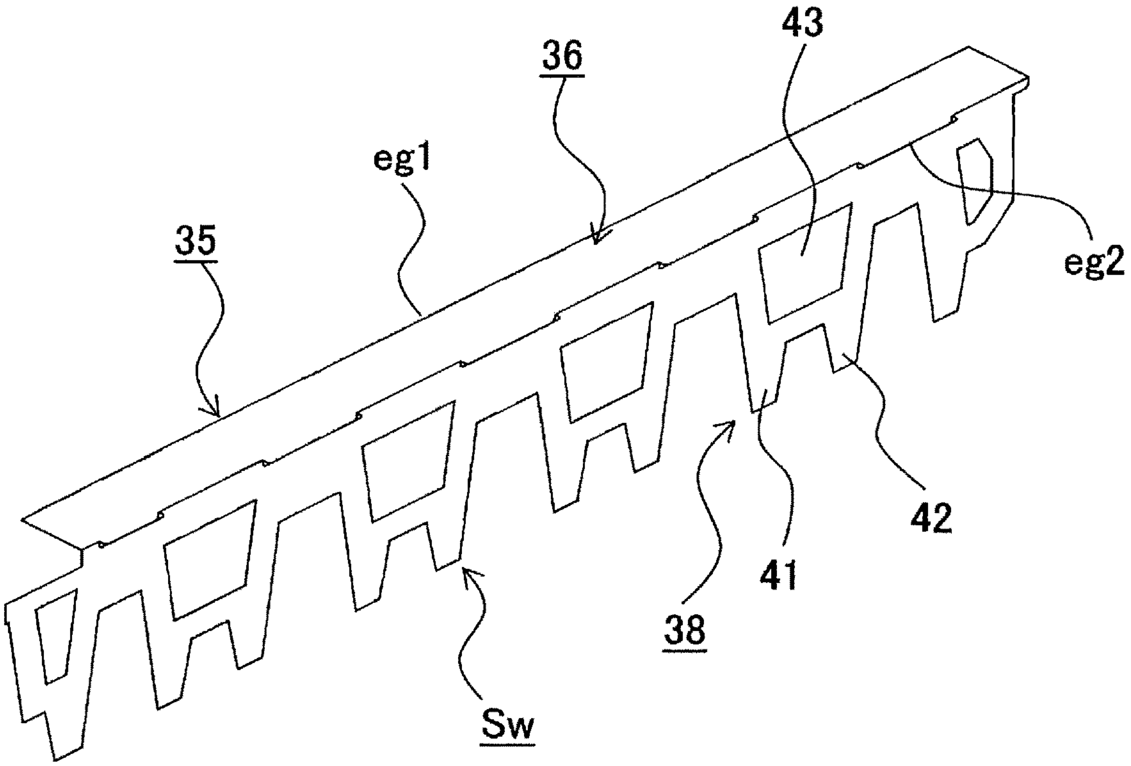
FIG. 7 is a perspective view of a swing device of the reference example.
Figure 8:
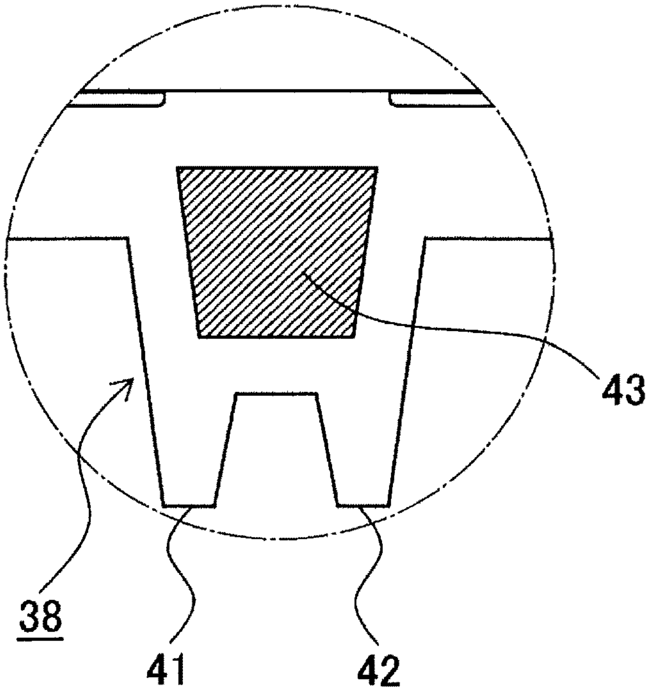
FIG. 8 is a view illustrating a major portion of a swing film of the reference example.
Figure 9:
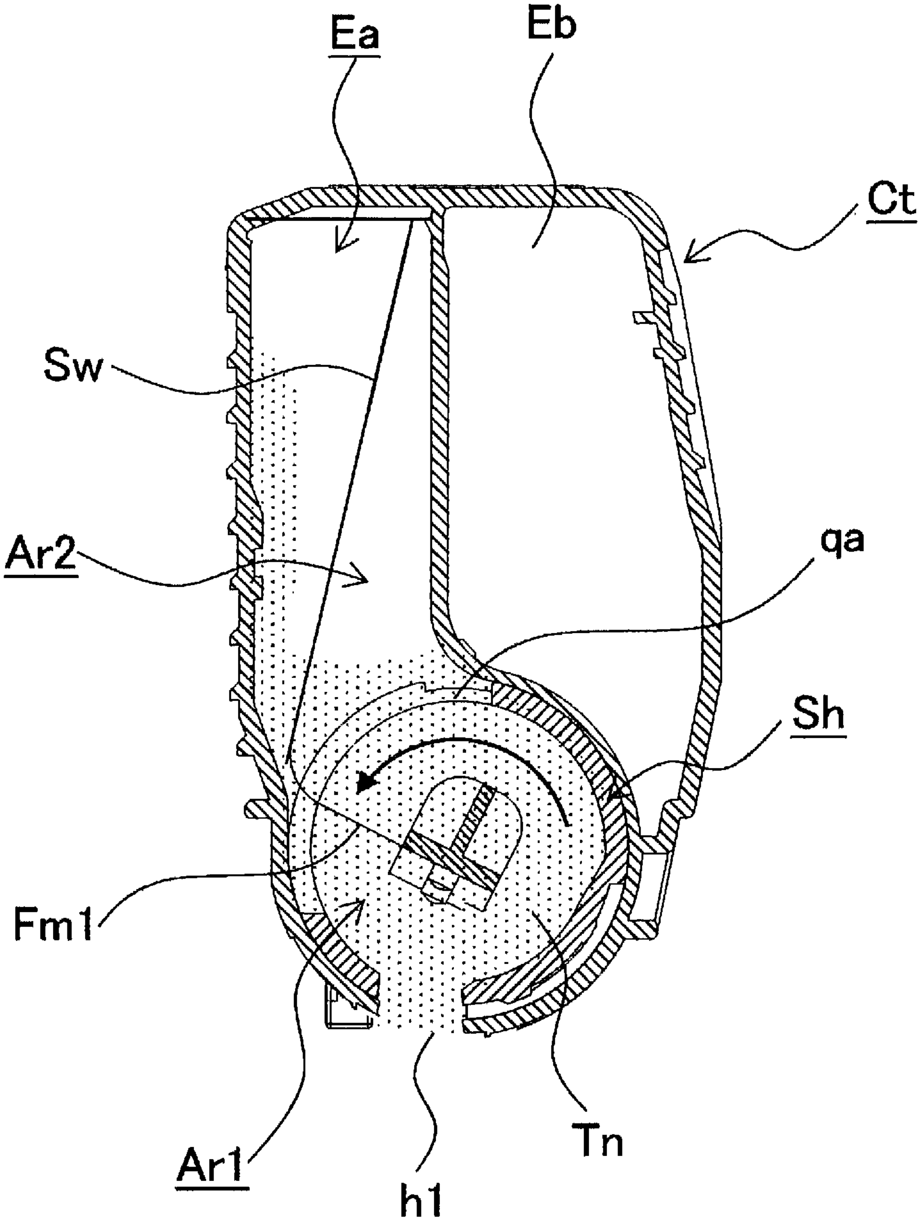
FIG. 9 is a second view for explaining the operation of the toner cartridge of the reference example.
Figure 10:
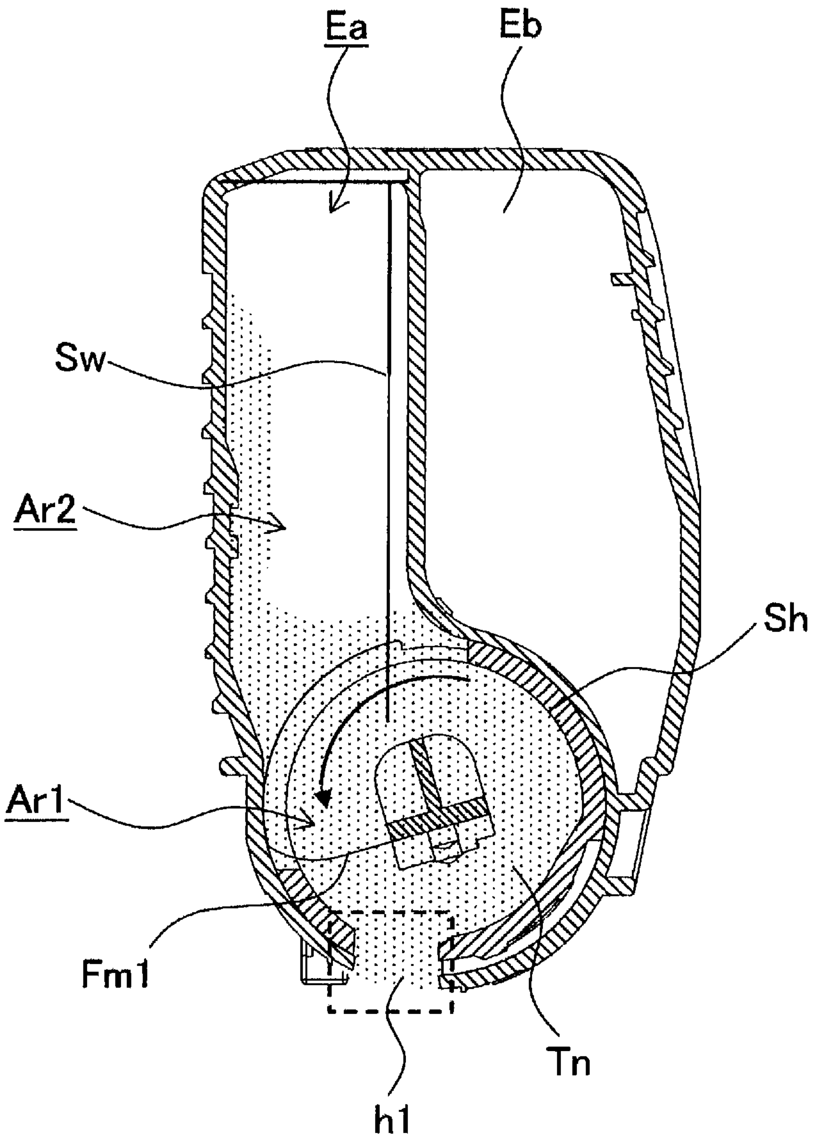
FIG. 10 is a third view for explaining the operation of the toner cartridge of the reference example.

FIG. 6 is a first view for explaining an operation of a toner cartridge of the reference example. FIG. 7 is a perspective view of a swing device of the reference example. FIG. 8 is a view illustrating a major portion of a swing film of the reference example. FIG. 9 is a second view for explaining the operation of the toner cartridge of the reference example. FIG. 10 is a third view for explaining the operation of the toner cartridge of the reference example.

In FIGS. 6 to 10, the toner cartridge Ct includes the housing Hz including the front wall Pf, rear wall Pr, top wall Pt, bottom wall Pb, toner storage chamber Ea, and waste toner collecting chamber Eb. The housing Hz serves as a container body and stores the toner Tn. The housing Hz further includes a central wall Pc, an opening h1 as a developer outlet, a first toner storage space Ar1 as a first developer storage space, and a second toner storage space Ar2 as a second developer storage space. The toner storage chamber Ea is formed between the front wall Pf and the central wall Pc. The waste toner collecting chamber Eb is formed between the rear wall Pr and the central wall Pc. The opening h1 is formed in the bottom wall Pb to extend in a longitudinal direction of the toner cartridge Ct. The first toner storage space Ar1 has a cylindrical shape, is formed to extend in the longitudinal direction of the toner cartridge Ct, and stores toner Tn. The second toner storage space Ar2 is formed to extend in the longitudinal direction of the toner cartridge Ct and rise from a front half portion of the first toner storage space Ar1, and stores toner Tn.

The toner cartridge Ct also includes the shutter Sh, which is disposed rotatably in the first toner storage space Ar1. The shutter Sh has a cylindrical shape, and is formed to extend in the longitudinal direction of the toner cartridge Ct. The shutter Sh includes an opening portion qa for allowing the first and second toner storage spaces Ar1 and Ar2 to communicate with each other, and a closing portion qb for closing the opening h1. In the circumferential direction of the shutter Sh, the opening portion qa occupies substantially one third of the shutter Sh, and the closing portion qb occupies substantially two thirds of the shutter Sh. The outlet h2 is formed at a predetermined position of the closing portion qb to correspond to the opening h1. When an operator rotates the shutter Sh by operating the operating lever Lv (see FIG. 5), which is formed integrally with the shutter Sh, and aligns the outlet h2 with the opening h1, the opening h1 is opened. Also, when an operator rotates the shutter Sh by operating the operating lever Lv and shifts the outlet h2 away from the opening h1, the opening h1 is closed.

In the image former 20 (see FIG. 3), a toner supply port (not illustrated) as a developer supply port is formed in the mounting surface Sr (see FIG. 5) to correspond to the opening h1. Thus, when the opening h1 is opened, toner Tn in the toner storage chamber Ea is discharged from the toner cartridge Ct, and supplied to the toner storage portion Rm in the image former 20.

In the shutter Sh in the first toner storage space Ar1, an agitating device 50 is disposed rotatably in the direction of arrow A to extend in the longitudinal direction of the toner cartridge Ct. The agitating device 50 is constituted by an agitating bar 51 disposed rotatably, and an agitating film Fm1 as an agitating member attached to the agitating bar 51 to project outward in a radial direction from a predetermined portion of the agitating bar 51.

The agitating film Fm1 is formed by an elastic film made of resin, and has a length in the radial direction greater than an inner radius of the shutter Sh.

In the second toner storage space Ar2, a swing device 35 for moving toner Tn in the second toner storage space Ar2 to the first toner storage space Ar1 is disposed. The swing device 35 is formed by folding an elastic resin film, e.g., a polyethylene terephthalate (PET) film. The swing device 35 includes an attachment portion 36 having a strip shape, and a swing film Sw as a swing member suspended in a direction perpendicular to the attachment portion 36 and formed to be swingable.

A front edge eg1 of the attachment portion 36 is locked (or engaged) with a projection formed at an upper end of the front wall Pf, and a rear edge eg2 of the attachment portion 36 is locked (or engaged) with a projection formed at an upper end of the central wall Pc, so that the swing device 35 is attached to the housing Hz at an upper end of the second toner storage space Ar2.

The swing film Sw includes projecting portions 38 formed at multiple positions, e.g., four positions, in the longitudinal direction of the toner cartridge Ct to project downward. In each of the projecting portions 38, a pair of projections 41 and 42 are formed at a lower end of the projecting portion 38, and a hole 43 for reducing the stiffness of the swing film Sw and reducing the load applied to the agitating film Fm1 is formed at a center of the projecting portion 38.

While the agitating film Fm1 moves in the shutter Sh with rotation of the agitating device 50, the agitating film Fm1 slides on the closing portion qb with its tip curved as illustrated in FIG. 6, and when reaching the opening portion qa of the shutter Sh, the agitating film Fm1 pushes a lower end of the swing film Sw forward with its tip slightly curved to rotate the swing film Sw clockwise as illustrated in FIG. 9. Then, when the tip of the agitating film Fm1 separates from the lower end of the swing film Sw, the swing film Sw is elastically rotated counterclockwise and returns to the initial state as illustrated in FIG. 10.

As above, in the toner cartridge Ct of the reference example, as the agitating device 50 rotates, the agitating film Fm1 rotates, toner Tn in the first toner storage space Ar1 is agitated, the swing film Sw is swung, and toner Tn in the second toner storage space Ar2 is fed to the first toner storage space Ar1.

However, in the toner cartridge Ct of the reference example, since the swing film Sw is not sufficiently swung and the area of the swing film Sw that comes into contact with the wall surface of the front wall Pf of the toner storage chamber Ea is small, the amount of toner Tn taken off the wall surface and fed to the first toner storage space Ar1 is small. As a result, a relatively large amount of toner Tn remains in the toner storage chamber Ea, and the toner Tn is not sufficiently discharged from the toner cartridge Ct.

Thus, in this embodiment, the toner cartridge Ct is configured so that first and second swing films Sw1 and Sw2 as swing members are suspended from an attachment portion 36 of a swing device 35.

Next, the toner cartridge Ct of this embodiment will be described. Elements having the same configurations as those of the toner cartridge Ct of the reference example are given the same reference characters, and descriptions of effects of the same configurations in the reference example apply to this embodiment.

Figure 1:
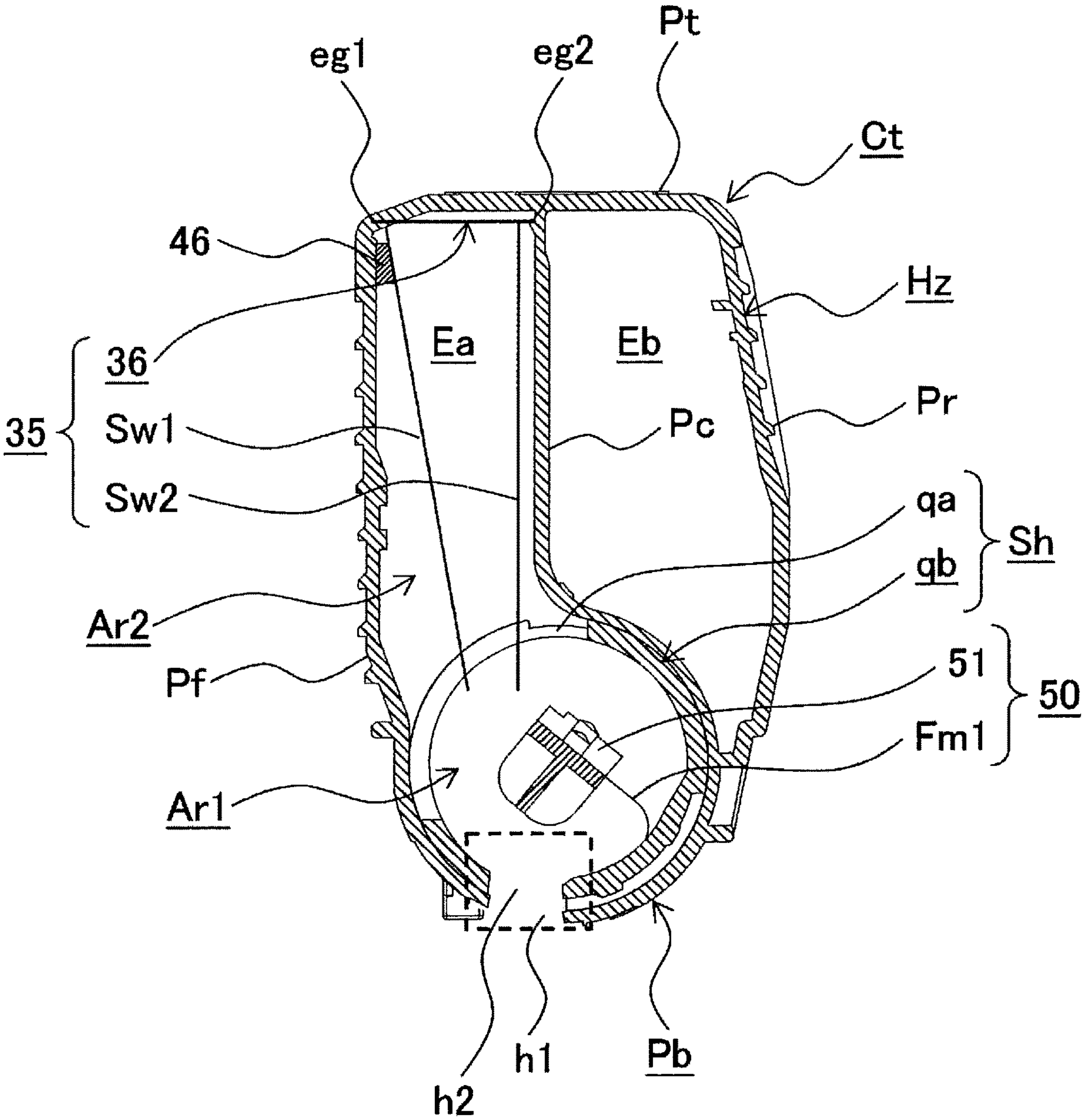
FIG. 1 is a transverse sectional view of a toner cartridge of a first embodiment of the present disclosure with a shutter open.
Figure 11:
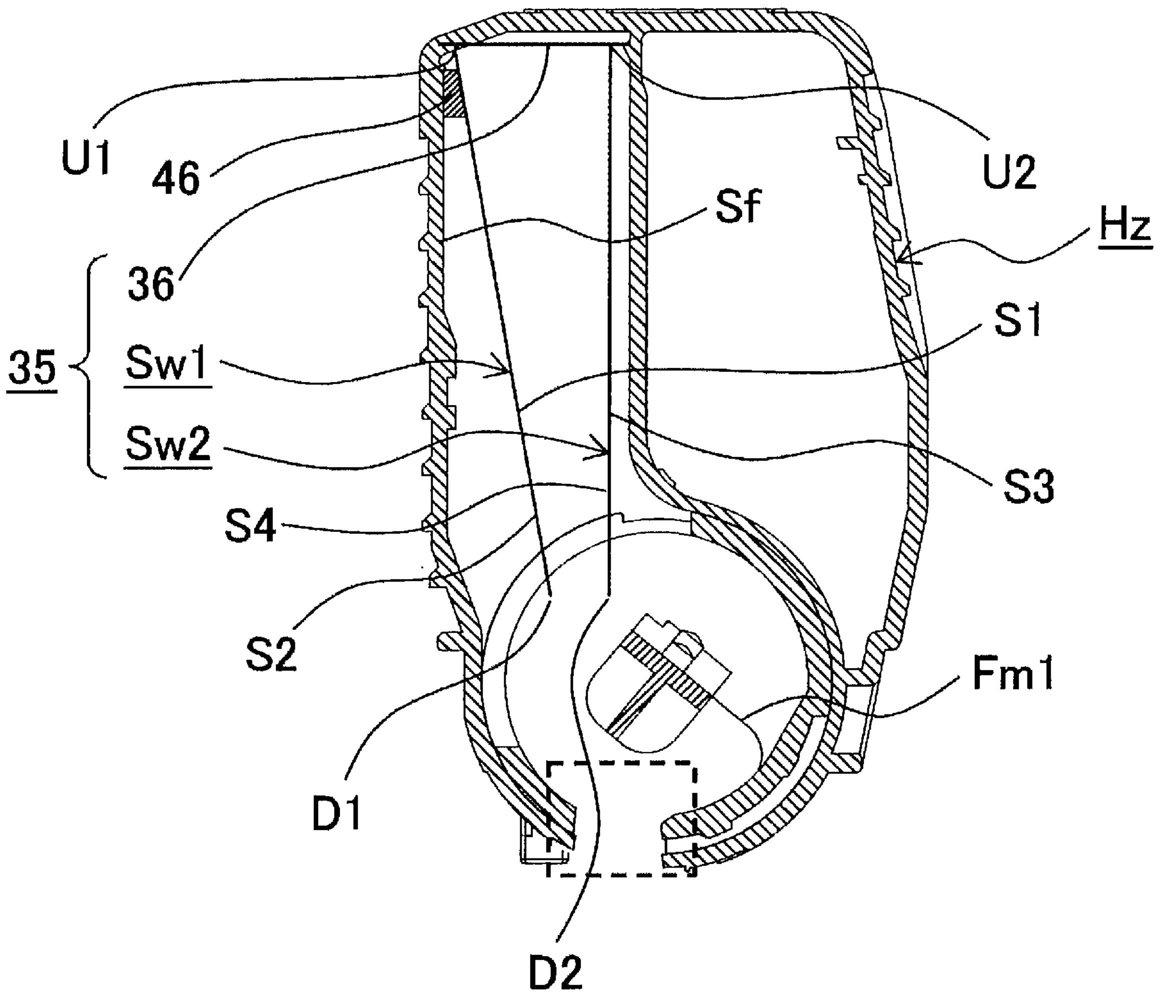
FIG. 11 is a conceptual view for explaining an operation of the toner cartridge of the first embodiment of the present disclosure.
Figure 12:
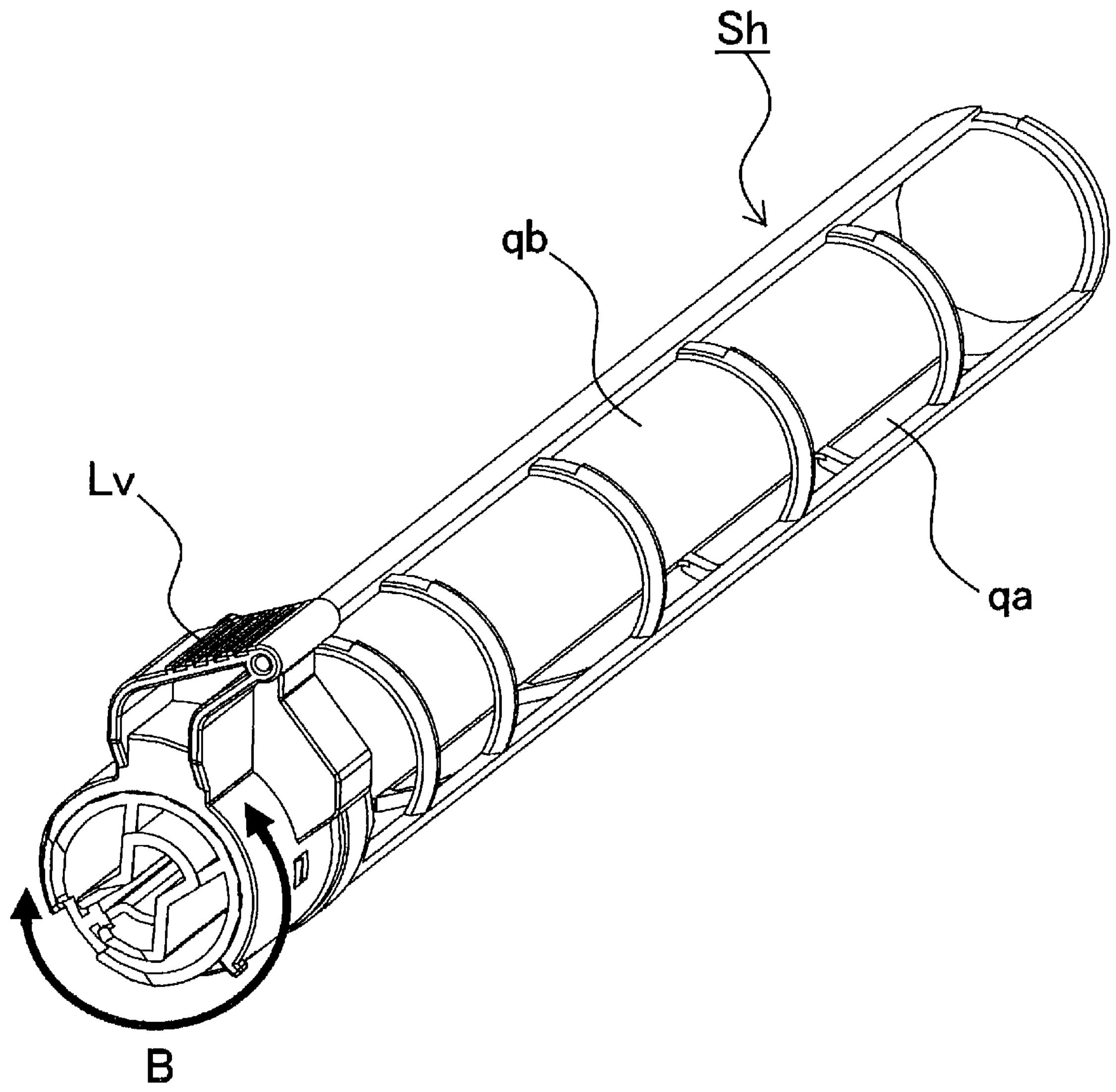
FIG. 12 is a perspective view of the shutter of the first embodiment of the present disclosure.
Figure 13:
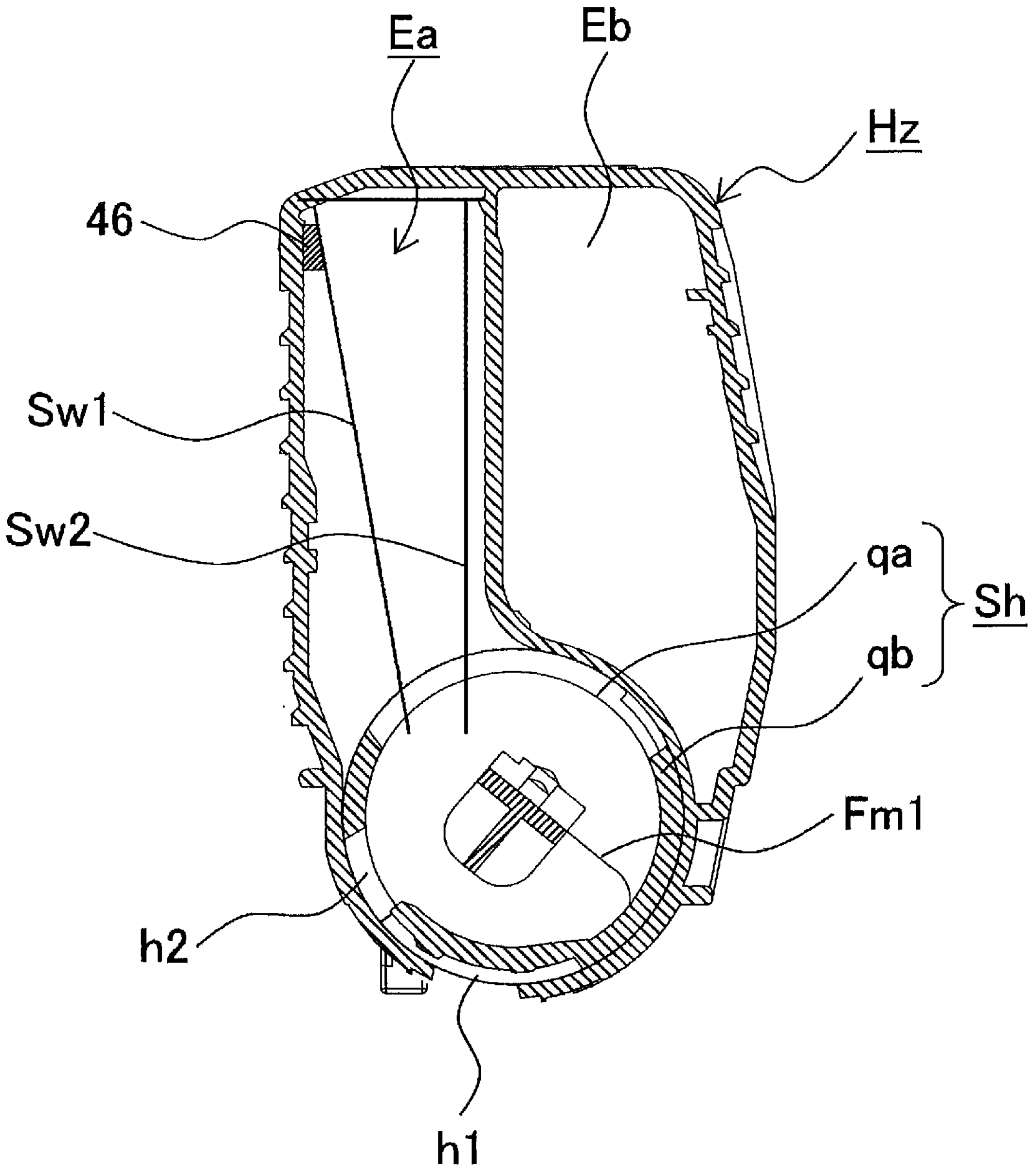
FIG. 13 is a transverse sectional view of the toner cartridge of the first embodiment of the present disclosure with the shutter closed.
Figure 14:
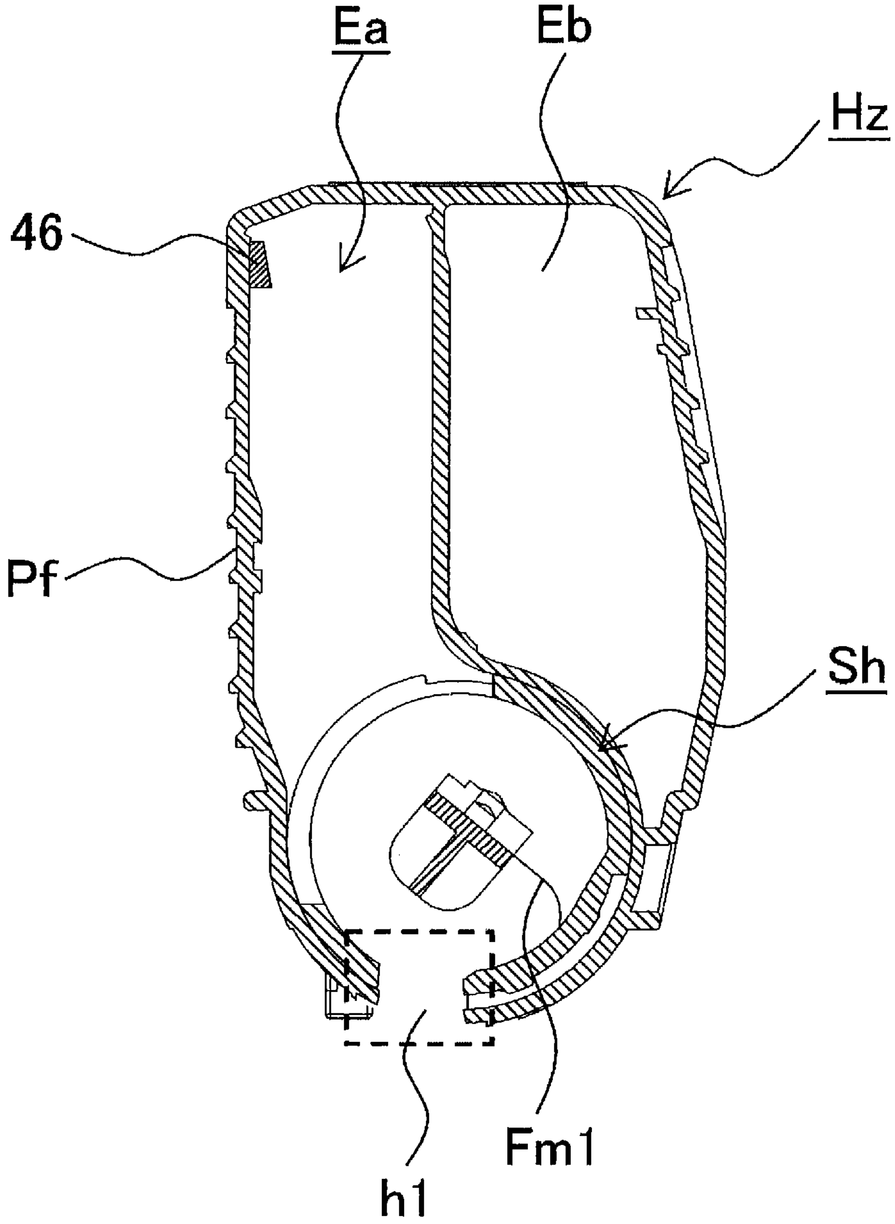
FIG. 14 is a transverse sectional view of the toner cartridge of the first embodiment of the present disclosure without a swing device being attached thereto.
Figure 15:
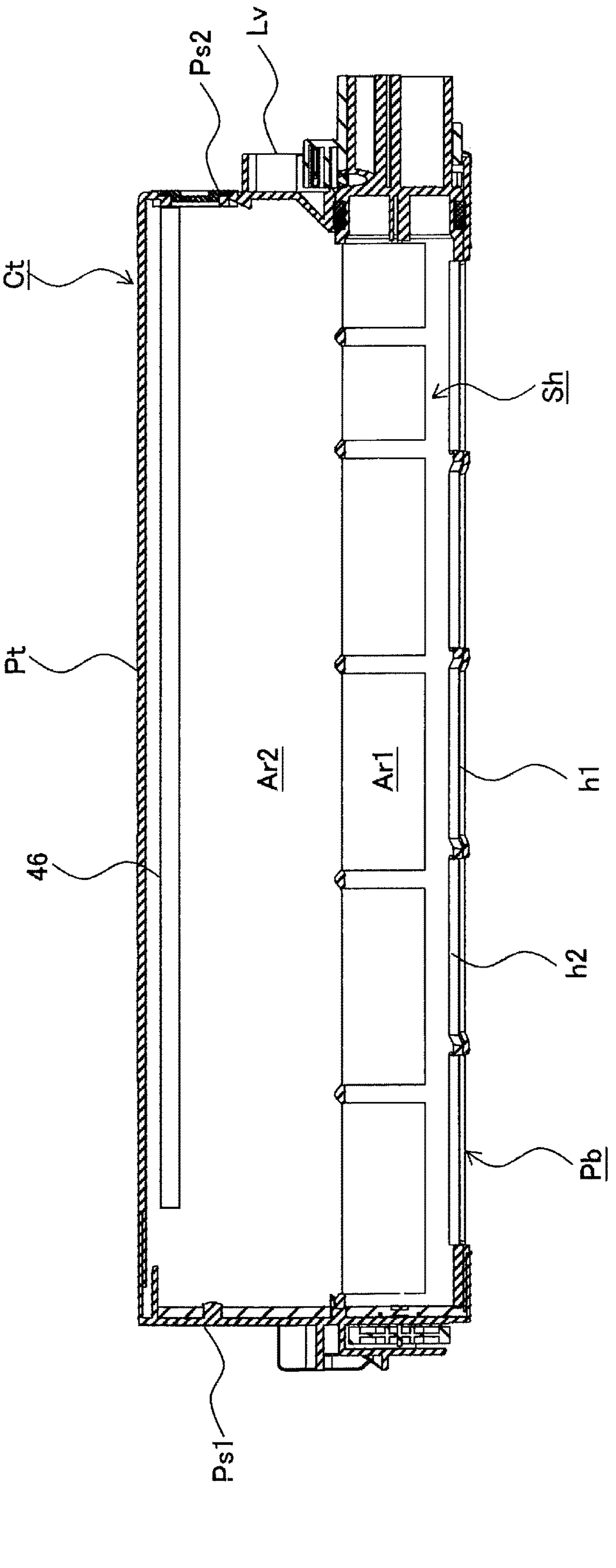
FIG. 15 is a longitudinal sectional view of the toner cartridge of the first embodiment of the present disclosure without the swing device being attached thereto.
Figure 16:
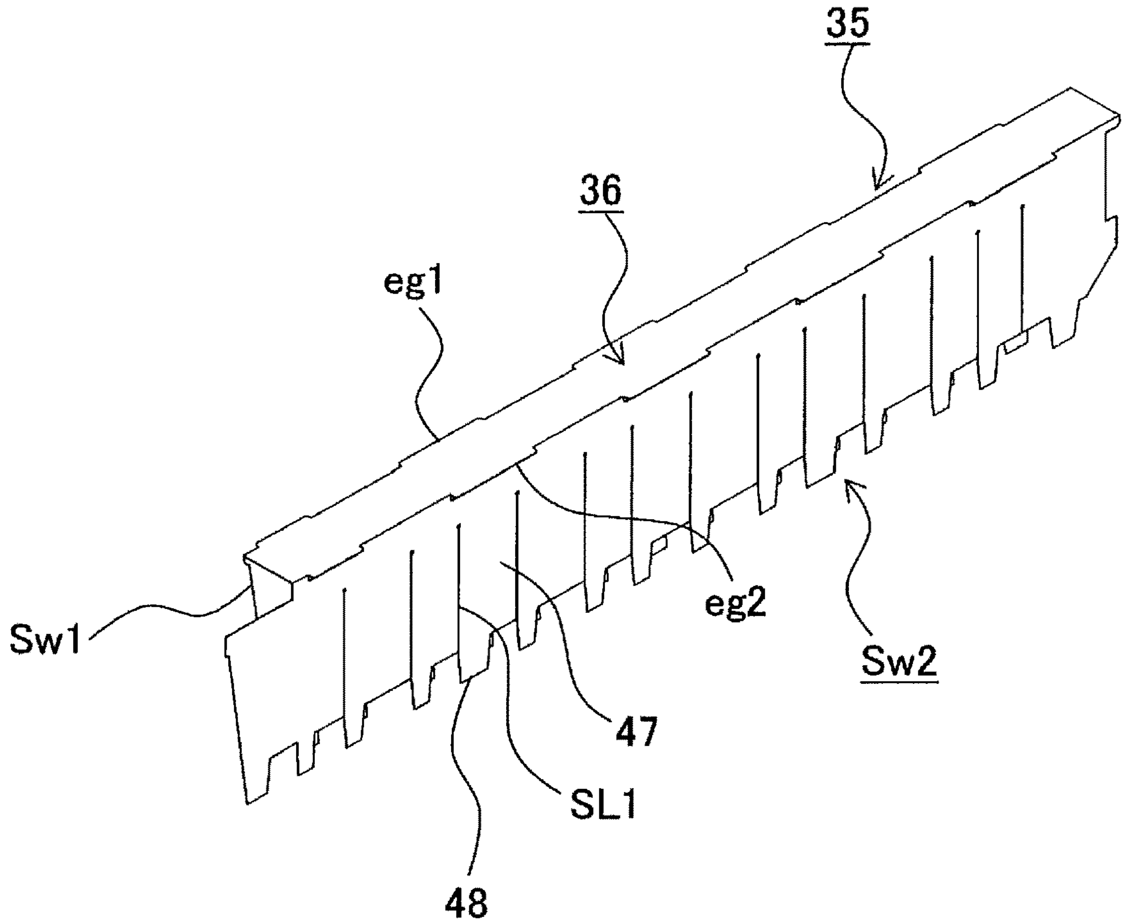
FIG. 16 is a perspective view of the swing device of the first embodiment of the present disclosure.
Figure 17:
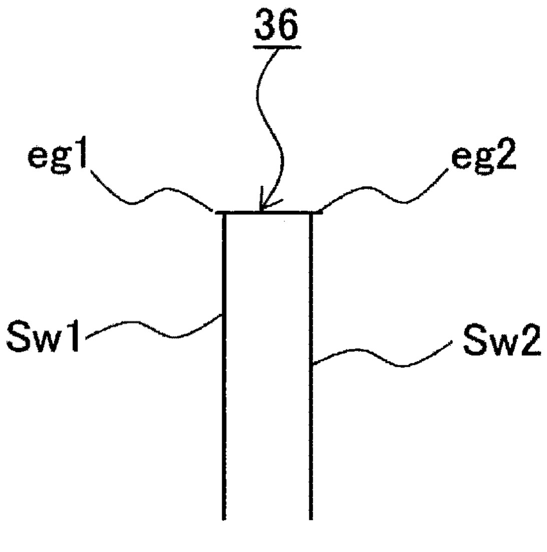
FIG. 17 is a side view of the swing device of the first embodiment of the present disclosure.
Figure 18:
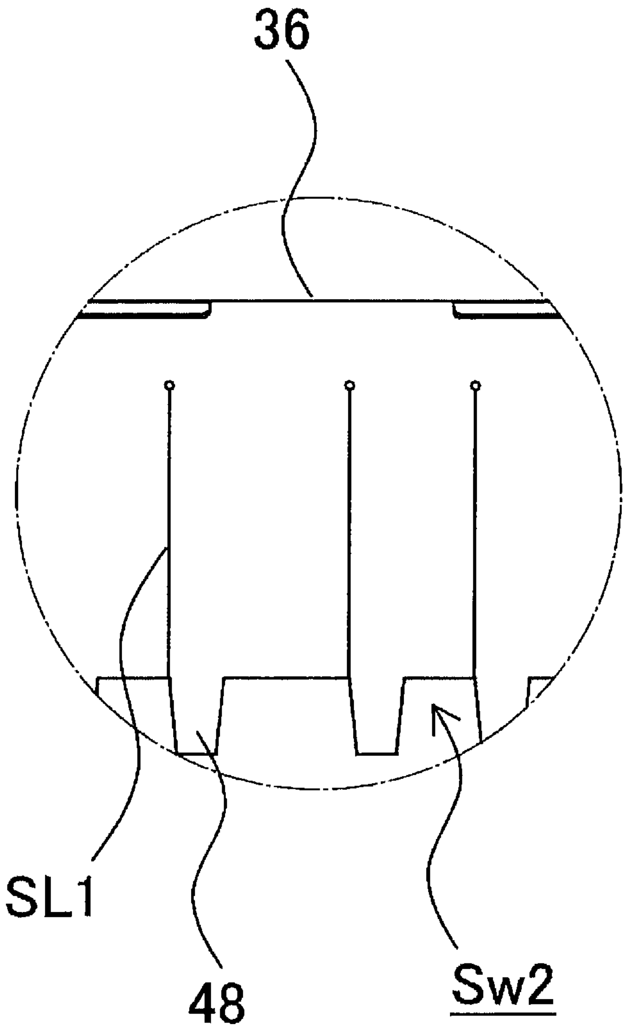
FIG. 18 is an enlarged view of a second swing film of the first embodiment of the present disclosure.

FIG. 1 is a transverse sectional view of the toner cartridge of the first embodiment of the present disclosure with the shutter open. FIG. 11 is a conceptual view for explaining an operation of the toner cartridge of the first embodiment of the present disclosure. FIG. 12 is a perspective view of the shutter of the first embodiment of the present disclosure. FIG. 13 is a transverse sectional view of the toner cartridge of the first embodiment of the present disclosure with the shutter closed. FIG. 14 is a transverse sectional view of the toner cartridge of the first embodiment of the present disclosure without the swing device being attached thereto. FIG. 15 is a longitudinal sectional view of the toner cartridge of the first embodiment of the present disclosure without the swing device being attached thereto. FIG. 16 is a perspective view of the swing device of the first embodiment of the present disclosure. FIG. 17 is a side view of the swing device of the first embodiment of the present disclosure. FIG. 18 is an enlarged view of the second swing film of the first embodiment of the present disclosure.

In FIGS. 1 and 11 to 18, the toner cartridge Ct includes the housing Hz including the front wall Pf, rear wall Pr, top wall Pt, bottom wall Pb, left wall Ps1, right wall Ps2, toner storage chamber Ea, and waste toner collecting chamber Eb. The housing Hz further includes a central wall Pc, an opening h1 as a developer outlet, a first toner storage space Ar1 as a first developer storage space, and a second toner storage space Ar2 as a second developer storage space.

The toner cartridge Ct also includes the shutter Sh, which is disposed rotatably in the direction of arrow B (see FIG. 12) in the first toner storage space Ar1. The shutter Sh has a cylindrical shape. The shutter Sh includes an opening portion qa for allowing the first and second toner storage spaces Ar1 and Ar2 to communicate with each other, and a closing portion qb for closing the opening h1. In the circumferential direction of the shutter Sh, the opening portion qa occupies substantially one third of the shutter Sh, and the closing portion qb occupies substantially two thirds of the shutter Sh. The outlet h2 is formed at a predetermined position of the closing portion qb to correspond to the opening h1.

The operating lever Lv for rotating the shutter Sh is disposed at a right end of the shutter Sh.

When an operator rotates the shutter Sh by operating the operating lever Lv and aligns the outlet h2 with the opening h1 as illustrated in FIG. 1, the opening h1 is opened. Also, when an operator rotates the shutter Sh by operating the operating lever Lv and shifts the outlet h2 away from the opening h1 as illustrated in FIG. 13, the opening h1 is closed.

In this embodiment, in the image former 20 (see FIG. 3), the toner supply port (not illustrated) as a developer supply port is formed in the mounting surface Sr (see FIG. 5) to correspond to the opening h1. Thus, when the opening h1 is opened, toner Tn in the toner storage chamber Ea is supplied to the toner storage portion Rm in the image former 20.

In the shutter Sh in the first toner storage space Ar1, an agitating device 50 is rotatably disposed. The agitating device 50 is constituted by an agitating bar 51 disposed rotatably, and an agitating film Fm1 as an agitating member that is attached to the agitating bar 51 to project outward in a radial direction from a predetermined portion of the agitating bar 51 and rotates to agitate toner Tn.

The agitating film Fm1 is formed by an elastic film made of resin (e.g., polyester), and has a length in the radial direction greater than an inner radius of the shutter Sh. A thickness of the agitating film Fm1 is preferably not less than 0.05 mm and not more than 0.5 mm, and in this embodiment, is 0.188 mm.

In the second toner storage space Ar2, the swing device for feeding toner Tn in the second toner storage space Ar2 to the first toner storage space Ar1 is disposed. The swing device 35 is formed by folding an elastic film made of resin into a U-shape (or an angled U-shape). The swing device 35 includes the attachment portion 36 and the first and second swing films Sw1 and Sw2 as swing members. The attachment portion 36 has a strip shape. The first and second swing films Sw1 and Sw2 are suspended from the attachment portion 36 and formed to be swingable. The second swing film Sw2 is suspended in a direction perpendicular to the attachment portion 36.

A front edge eg1 of the attachment portion 36 is locked (or engaged) with a projection formed at an upper end of the front wall Pf, and a rear edge eg2 of the attachment portion 36 is locked (or engaged) with a projection formed at an upper end of the central wall Pc, so that the swing device 35 is attached to the housing Hz at an upper end of the second toner storage space Ar2.

In this embodiment, as illustrated in FIG. 11, the first swing film Sw1 includes a first fixed end U1 that is a portion at which the first swing film Sw1 meets the attachment portion 36, a first free end D1 that is a lower end, a first surface S1 with which the agitating film Fm1 comes into contact while rotating, and a second surface S2 opposite the first surface S1. The first swing film Sw1 is swung by the agitating film Fm1 coming into contact with the first surface S1. The second swing film Sw2 includes a second fixed end U2 that is a portion at which the second swing film Sw2 meets the attachment portion 36, a second free end D2 that is a lower end, a third surface S3 with which the agitating film Fm1 comes into contact while rotating, and a fourth surface S4 formed to face the first surface S1. The second swing film Sw2 is swung by the agitating film Fm1 coming into contact with the third surface S3. The first and second fixed ends U1 and U2 are disposed on a ceiling surface, which is a lower surface of the attachment portion 36, disposed at an upper end of the housing Hz. The first swing member Sw1 is disposed to be suspended from the first fixed end U1. The second swing member Sw2 is disposed to be suspended from the second fixed end U2.

Moreover, a support rib 46 as a projecting support having a strip shape is disposed at an upper end of the front wall Pf in the second toner storage space Ar2 to project from a wall surface Sf (formed in the housing Hz) of the front wall Pf, extend in the longitudinal direction of the toner cartridge Ct, and face and abut the second surface S2.

The support rib 46 abuts the second surface S2 under the front edge eg1 of the attachment portion 36. Thus, as illustrated in FIGS. 1 and 11, the first swing film Sw1 is inclined with its lower end closer to the second swing film Sw2, instead of being suspended in a direction perpendicular to the attachment portion 36.

Each of the first and second swing films Sw1 and Sw2 is divided by first slits SL1 formed to extend in a transverse direction, i.e., an up-down direction, of the toner cartridge Ct (or formed in a transverse direction of the first and second swing films Sw1 and Sw2), at multiple positions, e.g., 13 positions, in the longitudinal direction of the toner cartridge Ct (or in a longitudinal direction of the housing Hz). Thereby, strip portions 47, which are multiple segments (or divided regions), are formed in each of the first and second swing films Sw1 and Sw2. In each of the strip portions 47, a projection 48 as a contact portion with which the agitating film Fm1 comes into contact is formed adjacent to a first slit SL1 at a lower end of the strip portion 47 to project downward. The first slits SL1 reduce the stiffnesses of the first and second swing films Sw1 and Sw2, and reduce the load applied to the agitating film Fm1 when the agitating film Fm1 pushes the first and second swing films Sw1 and Sw2 even in a case where the amount of toner Tn stored in the toner storage chamber Ea is large. To prevent the projections 48 from interfering with other members, the strip portions 47 are formed to have different widths as appropriate.

In this embodiment, there is no need to form a hole in the first swing film Sw1, and the area of contact between the first swing film Sw1 and the wall surface Sf can be made large. This makes it possible to sufficiently take toner Tn adhering to the wall surface Sf off the wall surface Sf.

Also, the projections 48 are formed at the lower ends of the respective strip portions 47, and the projections 48 are pushed by the agitating film Fm1. Thus, the areas of the first and second swing films Sw1 and Sw2 pushed by the agitating film Fm1 can be made small. Thus, the load applied to the agitating film Fm1 when the agitating film Fm1 pushes the first and second swing films Sw1 and Sw2 can be made small. In addition, the first and second swing films Sw1 and Sw2 can be made to operate uniformly in the longitudinal direction.

In each of the strip portions 47, the projection 48 is formed on one side of the lower end of the strip portion 47 in the longitudinal direction of the housing Hz. Specifically, in the second swing film Sw2, the projections 48 are formed on the left sides, which are one sides, of the lower ends of the strip portions 47, as illustrated in FIG. 16. On the other hand, in the first swing film Sw1, the projections 48 are formed on the right sides, which are the other sides, of the lower ends of the strip portions 47. Thus, when the agitating film Fm1 is brought into contact with the first and second swing films Sw1 and Sw2, the first and second swing films Sw1 and Sw2 are deformed such that the strip portions 47 of the first swing film Sw1 and the strip portions 47 of the second swing film Sw2 twist in opposite directions. This temporarily forms spaces between the strip portions 47, allowing toner Tn to freely move between the first and second swing films Sw1 and Sw2. In addition, the projections 48 are prevented from interfering with each other, and thus the first and second swing films Sw1 and Sw2 can be prevented from being restricted in motion.

Thus, the load applied to the agitating film Fm1 when the agitating film Fm1 pushes the first and second swing films Sw1 and Sw2 can be further reduced.

In this embodiment, the projections 48 are formed on the left sides and right sides of the lower ends of the strip portions 47. However, the projections 48 may be formed at other portions of the lower ends of the strip portions 47 so that the strip portions 47 are twisted when the agitating film Fm1 is brought into contact with the first and second swing films Sw1 and Sw2.

Next, an operation of the toner cartridge Ct will be described.

Figure 19:
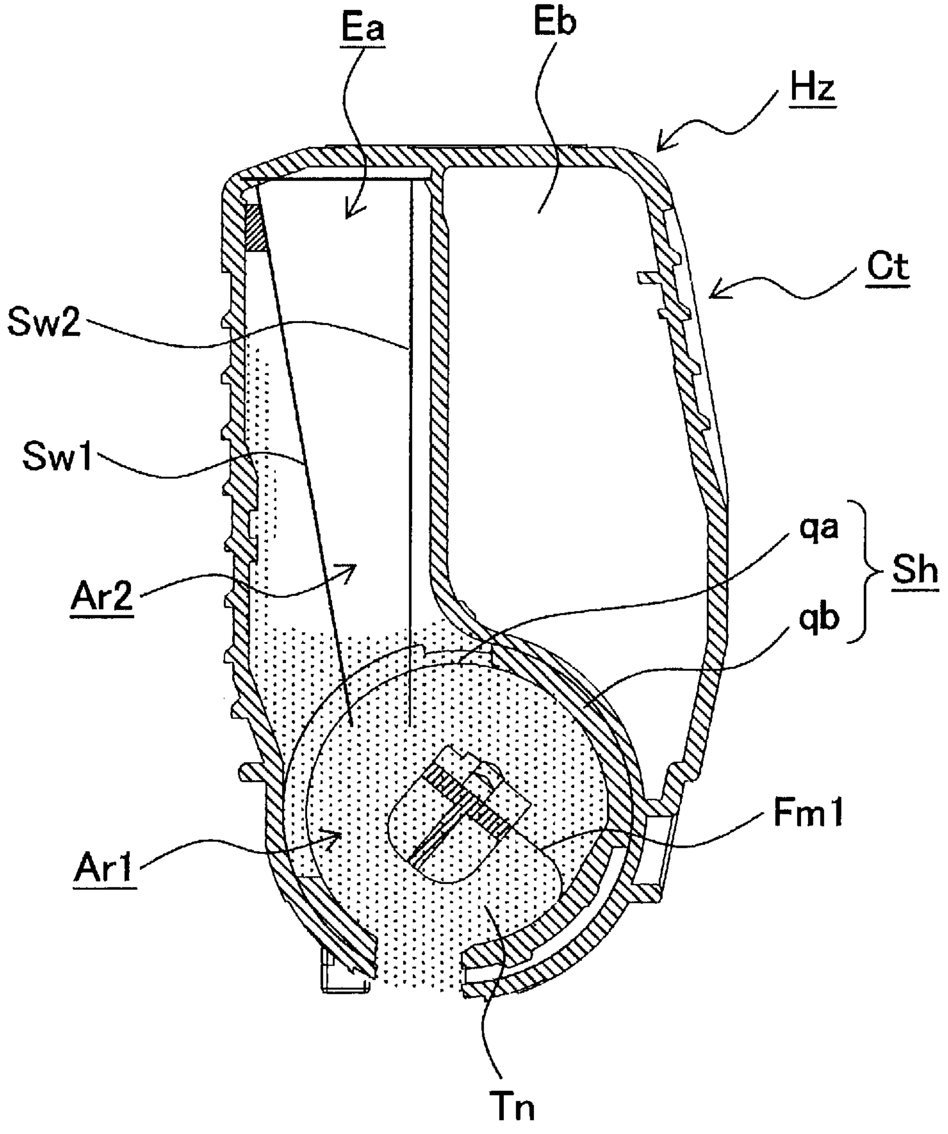
FIG. 19 is a first view for explaining an operation of the toner cartridge of the first embodiment of the present disclosure.
Figure 20:
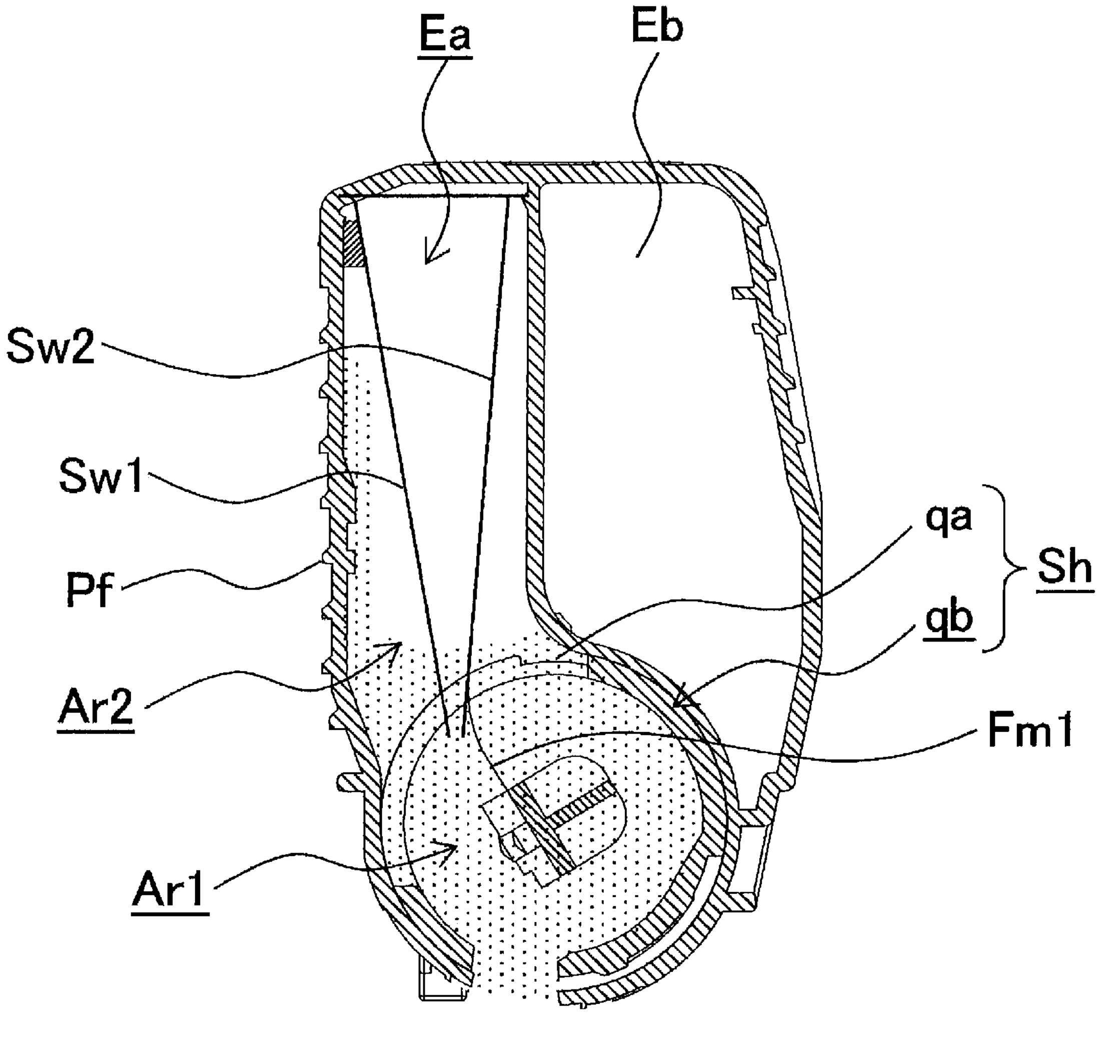
FIG. 20 is a second view for explaining the operation of the toner cartridge of the first embodiment of the present disclosure.
Figure 21:
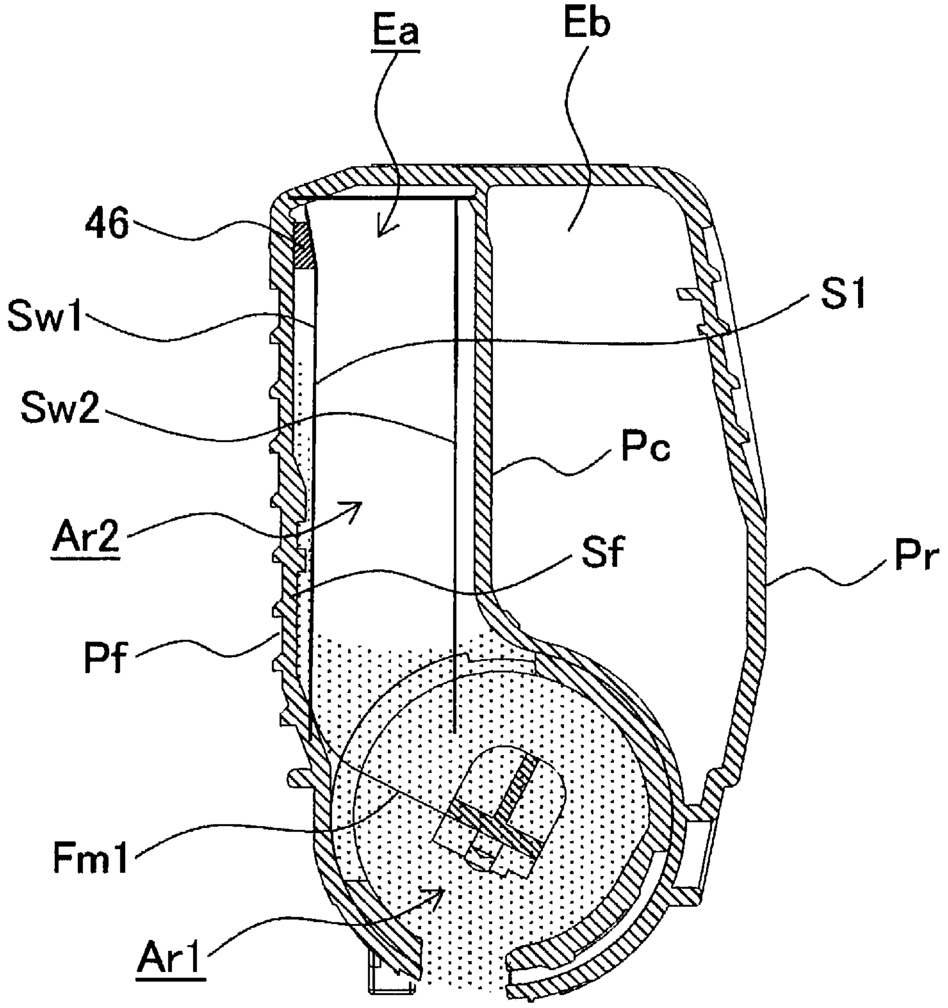
FIG. 21 is a third view for explaining the operation of the toner cartridge of the first embodiment of the present disclosure.
Figure 22:
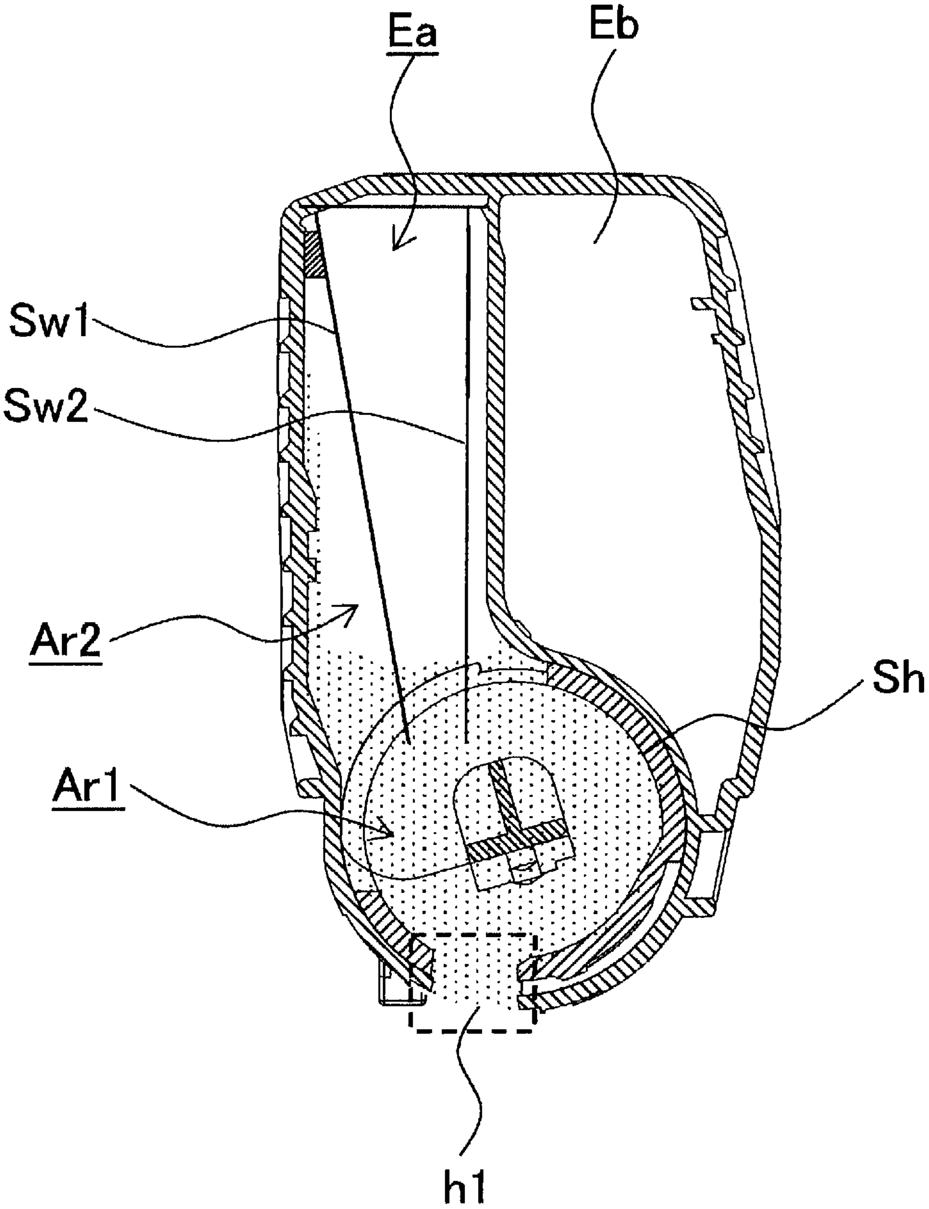
FIG. 22 is a fourth view for explaining the operation of the toner cartridge of the first embodiment of the present disclosure.

FIG. 19 is a first view for explaining an operation of the toner cartridge of the first embodiment of the present disclosure. FIG. 20 is a second view for explaining the operation of the toner cartridge of the first embodiment of the present disclosure. FIG. 21 is a third view for explaining the operation of the toner cartridge of the first embodiment of the present disclosure. FIG. 22 is a fourth view for explaining the operation of the toner cartridge of the first embodiment of the present disclosure.

In this embodiment, a center of rotation of the agitating film Fm1 is set below the first and second swing films Sw1 and Sw2. When the agitating film Fm1 moves in the shutter Sh with rotation of the agitating device 50, it slides on the closing portion qb with its tip curved, as illustrated in FIG. 19. At this time, the first and second swing films Sw1 and Sw2 are in their initial states, and the lower end of the first swing film Sw1 is located downstream of the lower end of the second swing film Sw2 in the rotation direction of the agitating film Fm1.

Then, when the agitating film Fm1 reaches the opening portion qa of the shutter Sh, the agitating film Fm1 pushes the lower end of the second swing film Sw2 forward with its tip slightly curved to rotate the second swing film Sw2 clockwise as illustrated in FIG. 20.

Then, when the tip of the agitating film Fm1 separates from the lower end of the second swing film Sw2, the second swing film Sw2 is elastically rotated counterclockwise and placed in the initial state as illustrated in FIG. 21.

Thereby, the second swing film Sw2 is swung, and toner Tn around the second swing film Sw2 is fed to the first toner storage space Ar1.

Also, as the tip of the agitating film Fm1 separates from the lower end of the second swing film Sw2, the agitating film Fm1 pushes the lower end of the first swing film Sw1 forward with its tip slightly curved, rotates the first swing film Sw1 clockwise, and brings the first swing film Sw1 into contact with the wall surface Sf of the front wall Pf. At this time, the first swing film Sw1, which is inclined by the support rib 46 in the initial state, is curved against the biasing force (or elastic force), and brought into contact with the wall surface Sf of the front wall Pf. The first swing film Sw1 is swung about a portion of the support rib 46 that abuts the first swing film Sw1 (or a portion of the first swing film Sw1 that abuts the support rib 46), and thereby brought into contact with the wall surface Sf.

Then, when the tip of the agitating film Fm1 separates from the lower end of the first swing film Sw1, the first swing film Sw1 is elastically rotated counterclockwise and placed in the initial state as illustrated in FIG. 22.

At this time, the first swing film Sw1 is swung by the biasing force (or elastic force), which is sufficiently large, about the portion of the first swing film Sw1 that abuts the support rib 46, and a sufficient amount of toner Tn around the first swing film Sw1 is fed to the first toner storage space Ar1. In addition, when the first swing film Sw1 separates from the wall surface Sf of the front wall Pf, toner Tn adhering to the wall surface Sf separates from the wall surface Sf. Thus, toner Tn in the second toner storage space Ar2 is reliably fed to the first toner storage space Ar1.

The toner Tn fed to the first toner storage space Ar1 is discharged through the opening h1 by rotation of the agitating film Fm1 and supplied to the toner storage portion Rm in the image former 20.

As above, in this embodiment, rotation of the agitating device 50 not only swings the first and second swing films Sw1 and Sw2 but also causes the first swing film Sw1 to come into contact with and separate from the wall surface Sf to take off toner Tn adhering to the wall surface Sf. Thus, the toner Tn in the second toner storage space Ar2 can be reliably fed to the first toner storage space Ar1.

Also, in this embodiment, as the first and second swing films Sw1 and Sw2 are swung, the swing device 35 vibrates. The vibration propagates to the housing Hz and vibrates the front wall Pf, central wall Pc, and the like. This takes off toner Tn adhering to the wall surface Sf of the front wall Pf, a wall surface of the central wall Pc, and the like. Thus, the toner Tn in the second toner storage space Ar2 can be more reliably fed to the first toner storage space Ar1.

Moreover, in this embodiment, the first swing film Sw1 supported by the support rib 46 is swung by the agitating film Fm1 coming into contact with the first surface S1 and brought into contact with the wall surface Sf. Thus, as the first swing film Sw1 comes into contact with and separates from the wall surface Sf, toner Tn adhering to the wall surface Sf is taken off.

Thus, it is possible to reduce the amount of toner Tn adhering to the wall surface Sf and remaining in the housing Hz, and sufficiently discharge toner Tn outside the toner cartridge Ct.

This makes it possible to reduce the amount of toner Tn put in the toner cartridge Ct in production thereof. This makes it possible not only to downsize the toner cartridge Ct, but also to reduce the cost of the toner cartridge Ct.

Although in this embodiment, the first slits SL1 are formed in both the first and second swing films Sw1 and Sw2, it is also possible to form first slits SL1 in at least one of the first and second swing films Sw1 and Sw2.

Next, a second embodiment of the present disclosure will be described. The second embodiment is the same as the first embodiment except for the configuration of the swing device 35. Elements having the same configurations as those of the first embodiment are given the same reference characters, and descriptions of effects of the same configurations in the first embodiment apply to the second embodiment.

Figure 23:
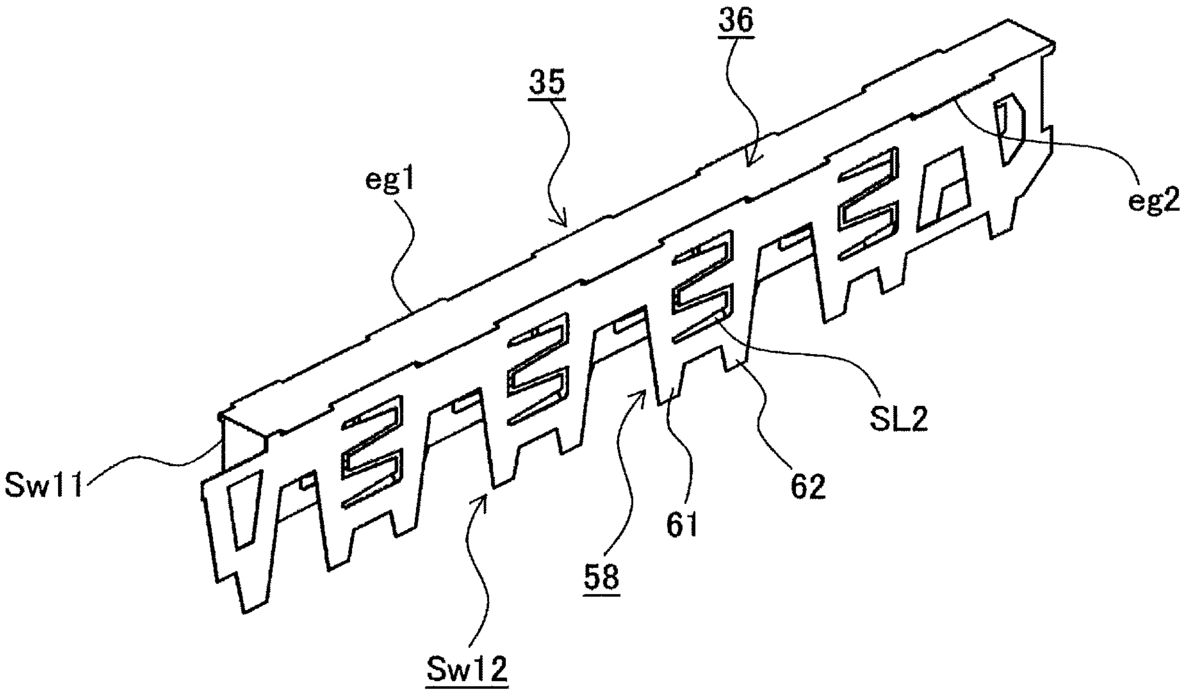
FIG. 23 is a perspective view of a swing device of a second embodiment of the present disclosure.
Figure 24:
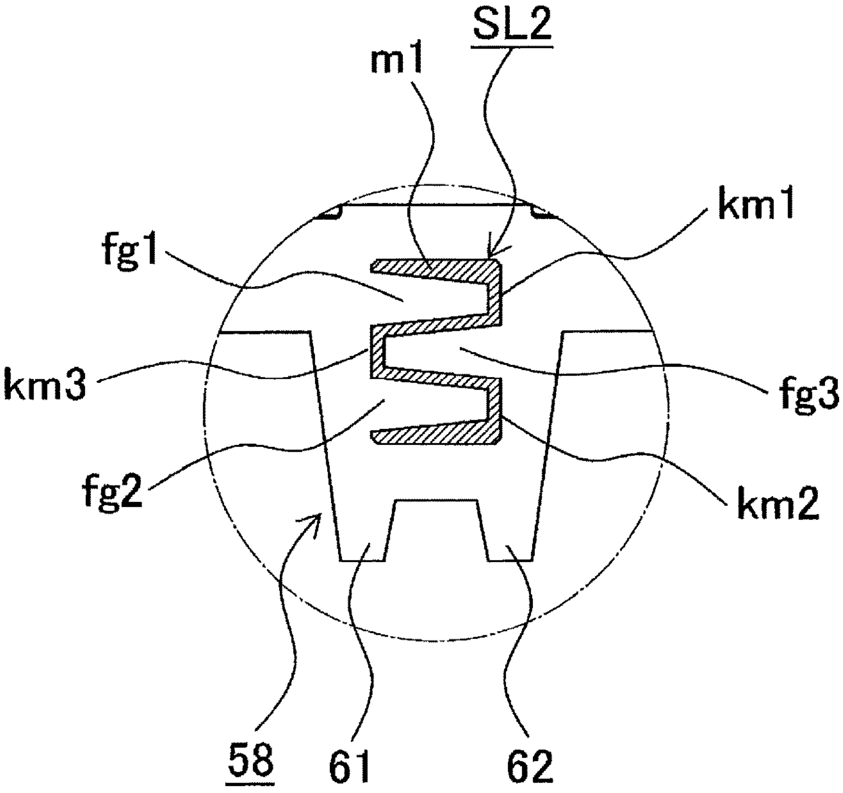
FIG. 24 is a view illustrating a major portion of a second swing film of the second embodiment of the present disclosure.

FIG. 23 is a perspective view of a swing device of the second embodiment of the present disclosure. FIG. 24 is a view illustrating a major portion of a second swing film of the second embodiment of the present disclosure.

FIG. 23 illustrates a swing device 35, which is formed by folding an elastic film made of resin into a U-shape (or an angled U-shape). The swing device 35 includes an attachment portion 36 and first and second swing films Sw11 and Sw12 as swing members. The attachment portion 36 has a strip shape. The first and second swing films Sw11 and Sw12 are suspended from the attachment portion 36 and formed to be swingable. The second swing film Sw12 is suspended in a direction perpendicular to the attachment portion 36, and the first swing film Sw11 is inclined, as in the first embodiment.

A front edge eg1 of the attachment portion 36 is locked (or engaged) with a projection formed at an upper end of the front wall Pf, and a rear edge eg2 of the attachment portion 36 is locked (or engaged) with a projection formed at an upper end of the central wall Pc, so that the swing device 35 is attached to the housing Hz at an upper end of the second toner storage space Ar2 as a second developer storage space.

The center of rotation of the agitating film Fm1 is set below the first and second swing films Sw11 and Sw12.

Each of the first and second swing films Sw11 and Sw12 includes projecting portions 58 formed to project downward, at multiple positions, e.g., four positions, in the longitudinal direction of the toner cartridge Ct as a developer container (or in the longitudinal direction of the housing Hz). In each of the projecting portions 58, a pair of projections 61 and 62 are formed on left and right sides of a lower end of the projecting portion 58 to project. Each of the projecting portions 58 has a substantially inverted trapezoidal shape, and each of the projections 61 and 62 also has a substantially inverted trapezoidal shape. In each of the projecting portions 58, a second slit SL2 is formed at a center of the projecting portion 58. The second slit SL2 may have a U-shape (or an angled U-shape). The second slit SL2 may be formed by a projection formed to project in the longitudinal direction of the housing Hz and a slot formed to surround the projection. Specifically, the second slit SL2 is formed by two projecting pieces fg1 and fg2 having a trapezoidal shape and formed to project from the left side to the right side of the projecting portion 58, one projecting piece fg3 having a trapezoidal shape and formed between the projecting pieces fg1 and fg2 to project from the right side to the left side of the projecting portion 58, and a slot m1 having a W-shape and formed by cutouts km1 to km3 formed to surround the projecting pieces fg1 to fg3.

As above, in this embodiment, the second slits SL2 are formed in the projecting portions 58. Thus, it is possible not only to reduce the stiffnesses of the first and second swing films Sw11 and Sw12 and reduce the load applied to the agitating film Fm1 as an agitating member when the agitating film Fm1 pushes the first and second swing films Sw11 and Sw12, but also to increase the area of contact between the first swing film Sw11 and the wall surface Sf and thereby sufficiently take off toner Tn as developer adhering to the wall surface Sf.

Also, the projecting pieces fg1 to fg3 are formed in the longitudinal direction of the toner cartridge Ct. This can allow the first and second swing films Sw11 and Sw12 to deform, and reduce the load applied to the agitating film Fm1, regardless of the amount of toner Tn remaining in the toner storage chamber Ea as a developer storage chamber.

Moreover, each of the projecting pieces fg1 to fg3 has a trapezoidal shape. This can prevent cantilever roots of the projecting pieces fg1 to fg3 from breaking due to stress concentration.

Although in this embodiment, the second slits SL2 are formed in both the first and second swing films Sw11 and Sw12, it is also possible to form second slits SL2 in at least one of the first and second swing films Sw11 and Sw12.

Although in this embodiment, each of the first and second swing films Sw11 and Sw12 includes the projecting portions 58, it is possible that at least one of the first and second swing films Sw11 and Sw12 includes the projecting portions 58.

In the above embodiments, toner Tn is used alone as a one-component system developer. However, toner and carrier may be used as a two-component system developer.

In the above embodiments, the toner cartridges Ct are detachably mounted to the image formers 20, which are main bodies of the image forming units 16Bk, 16Y, 16M, and 16C. However, it is also possible that the toner cartridge Ct and image former 20 are formed integrally with each other, and the toner storage chamber Ea is used as a developer container.

In the above embodiments, the printer 10 is described. However, the present disclosure is applicable to image forming apparatuses, such as copiers, facsimile machines, multi-function peripherals.

Embodiments of the present disclosure are not limited to the above embodiments, and various modifications can be made thereto without departing from the gist of the present disclosure.

What is claimed is:

1. A developer container comprising:

a container body that stores developer;

an agitating member that is rotatably disposed in the container body and rotates to agitate the developer;

a swing member that includes a fixed end, a free end, a first surface, and a second surface opposite to the first surface, and that is swung by the agitating member coming into contact with the first surface when the agitating member rotates; and a projecting support that is disposed to face the second surface and project from a wall surface formed in the container body, and that abuts the second surface, wherein a center of rotation of the agitating member is located below the swing member, the swing member is divided into a plurality of segments by a plurality of slits that are located at a plurality of positions, each of the plurality of slits extending from a lower end of the swing member in a transverse direction of the swing member orthogonal to a longitudinal direction of the container body in which the lower end of the swing member extends, the plurality of positions being respectively arranged along the lower end of the swing member so that each of the plurality of segments has a segment lower end, and each of the plurality of segments has a contact portion at the segment lower end thereof at one of two sides of the segment lower end that are opposite to each other in the longitudinal direction, the agitating member coming into contact with the contact portion.

2. The developer container of claim 1, wherein the swing member is a first swing member, the fixed end is a first fixed end, and the free end is a first free end, the developer container further comprising a second swing member that includes a second fixed end, a second free end, a third surface, and a fourth surface, and that is swung by the agitating member coming into contact with the third surface when the agitating member rotates, wherein the fourth surface is formed to face the first surface of the first swing member.

3. The developer container of claim 2, wherein the first and second fixed ends are disposed on a ceiling surface disposed at an upper end of the container body, the first swing member is disposed to be suspended from the first fixed end, the second swing member is disposed to be suspended from the second fixed end, and the first free end is located downstream of the second free end in a direction of rotation of the agitating member.

4. The developer container of claim 2, wherein the second swing member is divided into a plurality of segments by a plurality of slits that are located at a plurality of positions, each of the plurality of slits extending from a lower end of the second swing member in the transverse direction orthogonal to the longitudinal direction, the plurality of positions being respectively arranged along the lower end of the second swing member in the longitudinal direction so that each of the plurality of segments of the second swing member has a segment lower end, each of the plurality of segments of the second swing member has a contact portion at the segment lower end thereof at one of two sides of the segment lower end that are opposite to each other in the longitudinal direction, the agitating member coming into contact with the contact portion, and the one of the two sides where the contact portion of each of the plurality of segments of the first swing member is formed and the one of the two sides where the contact portion of each of the plurality of segments of the second swing member is formed are located opposite to each other in the longitudinal direction.

5. The developer container of claim 1, wherein the swing member is swung about a portion of the projecting support that abuts the swing member, and thereby brought into contact with the wall surface.

6. An image forming unit comprising the developer container of claim 1.

7. An image forming apparatus comprising the image forming unit of claim 6.

8. An image forming apparatus comprising the developer container of claim 1.

9. The developer container of claim 1, wherein the fixed end is disposed on a ceiling surface disposed at an upper end of the container body, the swing member is disposed so as to be suspended from the fixed end, and the projecting support is disposed at an upper end of the wall surface.

10. The developer container of claim 1, wherein the contact portion of each of the plurality of segments protrudes from the segment lower end thereof, and is directly adjacent to the one of two sides of the segment lower end thereof and is away from the other one of the two sides of the segment lower end thereof.

* * * * *